US010652154B1

(12) United States Patent
Matthews et al.

(10) Patent No.: US 10,652,154 B1
(45) Date of Patent: May 12, 2020

(54) TRAFFIC ANALYZER FOR AUTONOMOUSLY CONFIGURING A NETWORK DEVICE

(71) Applicant: Innovium, Inc., San Jose, CA (US)

(72) Inventors: William Brad Matthews, San Jose, CA (US); Bruce Hui Kwan, Sunnyvale, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 16/186,369

(22) Filed: Nov. 9, 2018

(51) Int. Cl.
*H04L 12/803* (2013.01)
*H04L 12/947* (2013.01)
*H04L 12/24* (2006.01)
*G06N 3/08* (2006.01)
*G06N 5/02* (2006.01)
*G06N 20/00* (2019.01)
*H04W 52/02* (2009.01)

(52) U.S. Cl.
CPC ............ *H04L 47/125* (2013.01); *G06N 3/08* (2013.01); *G06N 5/022* (2013.01); *G06N 20/00* (2019.01); *H04L 41/08* (2013.01); *H04L 49/25* (2013.01); *H04W 52/0203* (2013.01)

(58) Field of Classification Search
CPC ......... G06N 3/08; G06N 5/022; G06N 20/00; H04W 52/0203; H04L 47/125; H04L 41/08; H04L 49/25
See application file for complete search history.

(56) References Cited

U.S. PATENT DOCUMENTS

2014/0201354 A1* 7/2014 Matthews ............... H04L 43/04
709/224
2019/0238449 A1* 8/2019 Michael .............. H04L 43/0864

* cited by examiner

*Primary Examiner* — Benjamin H Elliott, IV
(74) *Attorney, Agent, or Firm* — Wong & Rees LLP; Karl T Rees

(57) ABSTRACT

Approaches, techniques, and mechanisms facilitate actionable reporting of network state information and real-time, autonomous network engineering directly in-network at a switch or other network device. A data collector within the network device collects state information and/or data unit information from various device components, such as traffic managers and packet processors. The data collector, which may optionally generate additional state information by performing various calculations on the information it receives, is configured to then provide at least some of the state information to an analyzer device connected to an analyzer interface. The analyzer device, which may be a separate device, performs various analyses on the state information, depending on how it is configured. The analyzer device outputs reports that identify statuses, errors, misconfigurations, and/or suggested actions to take to improve operation of the network device. In an embodiment, some or all actions that may be suggested therein are executed automatically.

20 Claims, 8 Drawing Sheets

TRAFFIC ANALYZER FOR AUTONOMOUSLY CONFIGURING A NETWORK DEVICE

CROSS-REFERENCE TO RELATED APPLICATIONS

This application is related to U.S. patent application Ser. No. 16/186,361, filed on Nov. 9, 2018, entitled "Traffic Analyzer for Network Device," by Brad Matthews and Bruce Kwan, the entire contents of which are hereby incorporated by reference for all purposes as if fully set forth herein.

TECHNICAL FIELD

Embodiments relate generally to handling network packets and/or other data units in systems such as, without limitation, data switching networks, and, more specifically, to techniques for analyzing operations of such systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

A network device may include any number of internal hardware and/or software components configured to handle the movement of data between processing components within the device and, eventually, out of the device. It is desirable for these components to quickly determine where to send and/or store data for processing, and to expediently send and/or store that data to the appropriate destination once determined.

One approach for diagnosing problems that may degrade performance of a network device relies on logging events and statistics at a centralized data collection system. Such systems may collect massive amounts of data, through which network administrators may spend days or even weeks perusing logs and other data to identify potential problems with the components of the network device, such as table misconfigurations, buffer oversaturation, and so forth.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
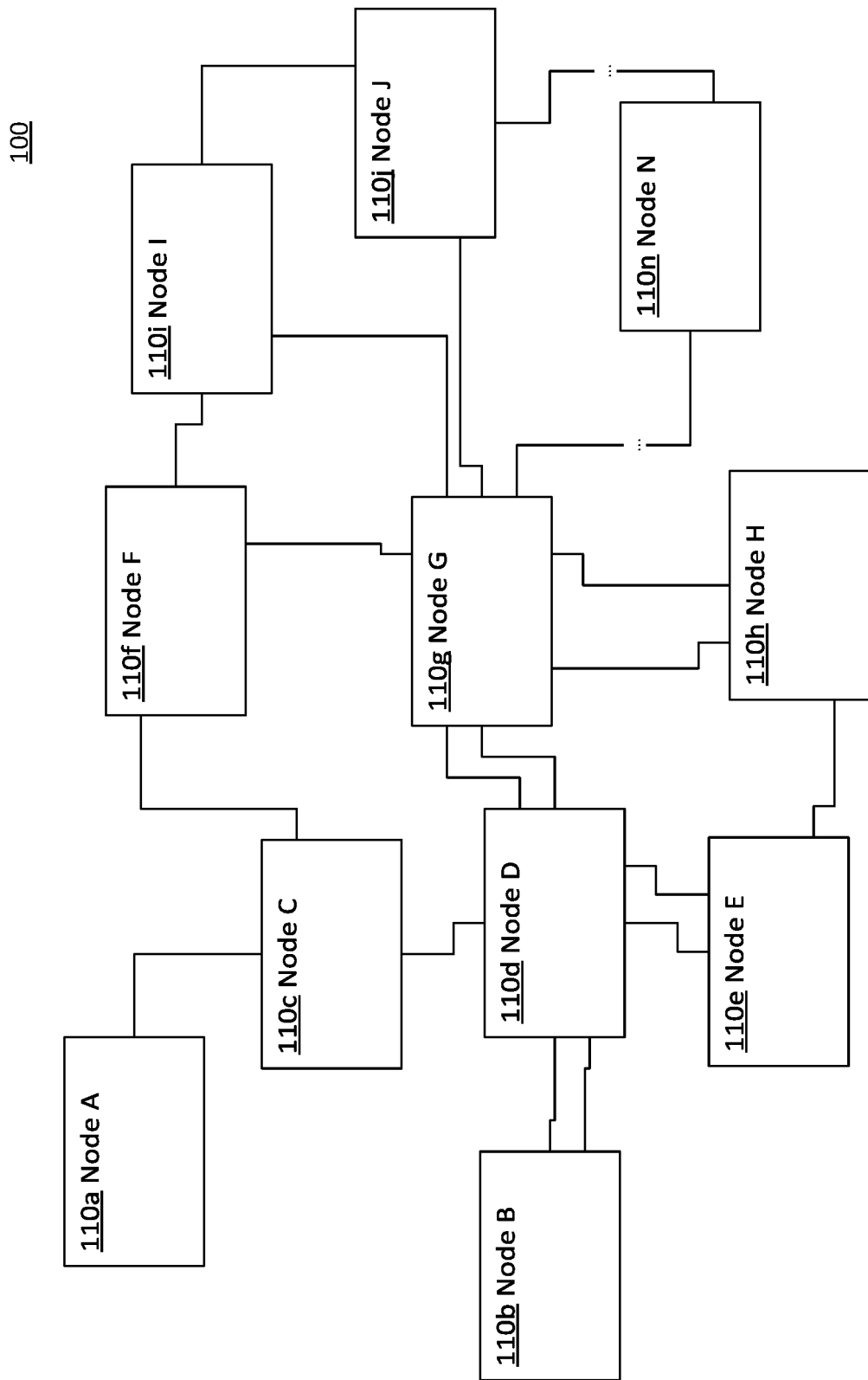
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Packets and Other Data Units
2.2. Network Paths
2.3. Network Device
2.4. Ports
2.5. Packet Processors
2.6. Buffers
2.7. Queues
2.8. Traffic Manager
2.9. Ingress Arbiter
2.10. Forwarding Logic
2.11. Multiple Pipelines
2.12. Accounting Mechanism
2.13. Collector
2.14. Analyzer
2.15. Device Control Logic
2.16. Miscellaneous
3.0. Functional Overview
3.1. Monitoring Device Components
3.2. Collecting State Information
3.3. Analyzing State Information with a Neural Network
4.0. Use Cases
4.1. Resolving Device Misconfigurations
4.2. Anticipating Traffic Patterns
4.3. In-Network Application-Specific Traffic Manipulation
5.0. Example Embodiments
6.0. Implementation Mechanism—Hardware Overview
7.0. Extensions and Alternatives

1.0. General Overview

Approaches, techniques, and mechanisms are disclosed for, among other aspects, facilitating actionable reporting of network state information and real-time, autonomous network engineering directly in-network at a switch or other network device. A data collector within the network device collects state information and/or data unit information from various device components, such as traffic managers and packet processors. The data collector, which may optionally generate additional state information by performing various calculations on the information it receives, is configured to then provide at least some of the state information to an analyzer interface. An analyzer device may be connected to this interface, and perform various analyses on the state information, depending on how it is configured. The analyzer device outputs reports that identify device status information, errors, misconfigurations, and/or suggested actions to take to improve operation of the network device. In an embodiment, a report processor may receive and process the reports, optionally causing automatic execution of some or all actions that may be suggested therein.

In an embodiment, the analyzer device is a separate device from the network device. For instance, the analyzer device may be a Field Programmable Gate Array, Application-Specific Integrated Circuit, or other integrated circuit that may be connected to the network device within an appropriate assembly after the network device has been manufactured. In an embodiment, the analyzer device may be on a separate board or card. In an embodiment, the analyzer device may be a modular device or even hot-swappable, such that it may be connected to and removed from the network device at ease. In an embodiment, the analyzer device may be on the same board or even the same chip as the network device. In an embodiment, there may be multiple types of analyzer devices, suited to different applications and/or contexts.

In an embodiment, the analyzer device comprises logic that implements one or more neural networks. The neural network may be trained to identify errors, misconfigurations, and/or suggested actions for the network device based on the data that the data collector provides to the analyzer device. The neural network may be updated over time. For instance, a manufacturer of the analyzer device may provide updates to the analyzer device based on updated training. Or, the analyzer device may be configured to continue training the neural network based on feedback gathered from the state information it receives.

In an embodiment, the data collector may also or instead be configured to provide data unit information for at least certain data units that pass through the various components of the network device. For instance, a sample of dropped data units may be passed to the data collector. The collector may forward these data units, or at least certain information about these data units, to the analyzer device, which may be configured to diagnose a reason or even a possible solution for the drop. For instance, the analyzer device may suggest a change to a forwarding table, or the implementation of a certain traffic shaping policy or flow control policy. As another example, a sample of all data units received by a traffic manager may be forwarded to the analyzer device, which may be configured to predict potential congestion from certain traffic flows based on attributes of the data units it observes as well as the state information.

In an embodiment, the analyzer device may be configured to execute application-specific logic and take application-specific actions at a network switching device to which it has been coupled. The analyzer device may be configured to collect application-specific data, of which the network switching device would not normally be aware, from data units passed to the analyzer device by the data collector.

Based on this application-specific data, the analyzer device may recognize data units that likely correspond to risky or undesirable behavior. For instance, the analyzer device may identify a data unit that carries an order for a risky transaction. The analyzer device may instruct the network device to drop the data unit, thereby stopping the behavior. Or, the analyzer device may edit such a data unit, redirect the data unit to an intercepting device, manipulate or drop other data units that belong to same traffic flow as the data unit, and/or take other suitable measures to implement application-specific decisions made by the application-specific logic. As further examples, the analyzer device may reconfigure the network device to better optimize performance in the form of throughput, power consumption, loss rate, and so forth by adjusting various device settings, a voltage level, a processor or memory operating frequency, etc.

In other aspects, the inventive subject matter encompasses computer apparatuses and computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Packets and Other Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment, IP packet, etc.) to a second node 110 over a path that includes an intermediate node 110. This data unit will be broken into smaller data units at various sublevels before it is transmitted from the first node 110. These smaller data units may be referred to as "subunits" or "portions" of the larger data unit.

For example, the data unit may be broken into packets, then cells, and eventually sent out as a collection of signal-encoded bits to the intermediate node 110. Depending on the network type and/or the device type of the intermediate node 110, the intermediate node 110 may rebuild the entire original data unit before routing the information to the second node 110, or the intermediate node 110 may simply rebuild certain subunits of the data (e.g. frames and/or cells) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the data unit, a label to attach the data unit, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

Data units may be single-destination or multi-destination. Single-destination data units are typically unicast data units, specifying only a single destination address. Multi-destination data units are often multicast data units, specifying multiple destination addresses, or addresses shared by multiple destinations. However, a given node may in some circumstances treat unicast data units as having multiple destinations. For example, the node may be configured to mirror a data unit to another port such as a law enforcement port or debug port, copy the data unit to a central processing unit for diagnostic purposes or suspicious activity, recirculate a data unit, or take other actions that cause a unicast data unit to be sent to multiple destinations. By the same token, a given data unit may in some circumstances treat a multi-cast data unit as a single-destination data unit, if, for example all destinations targeted by the data unit are reachable by the same egress port.

For convenience, many of the techniques described in this disclosure are described with respect to routing data units that are IP packets in an L3 (level 3) network, or routing the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the "data units" are of any other type of data structure communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
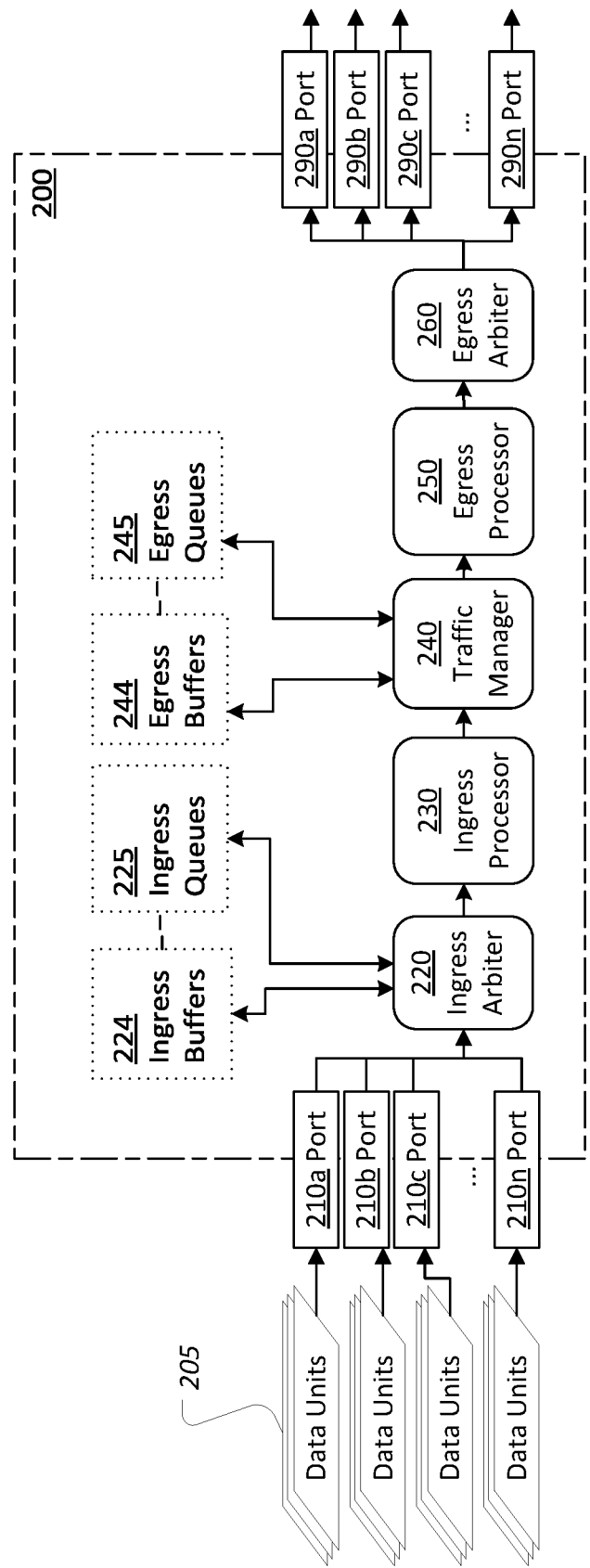
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through components of a device 200 is as follows. The data unit 205 may be received by a port 210. The data unit 205 is buffered by an arbiter 220 until it can be processed by an ingress processor 230, and then delivered to an interconnect. From the interconnect, the data unit 205 is forwarded to a traffic manager 240. Traffic manager 240 stores the data unit 205 in a buffer 244 and assigns the data unit 205 to a queue 245. Traffic manager 240 manages the flow of the data unit 205 through the queue 245 until the data unit 205 is released to an egress processor 250. Depending on the processing, the traffic manager 240 may then assign the data unit 205 to another queue 245 so that it may be processed by yet another egress processor 250, or the egress processor 250 may send the data unit 205 to an egress arbiter 260 from which the data unit 205 is finally forwarded out another port 290.

Example components of a device 200 are now described in further detail.

2.4. Ports

Network device 200 includes ports 210/290. Ports 210, including ports 210a-n, are inbound ("ingress") ports by which data units 205 are received over a network, such as network 210. Ports 290, including ports 290a-n, are outbound ("egress") ports by which at least some of the data units 205 are sent out to other destinations within the network, after having been processed by the network device 200.

Data units 205 may be of any suitable structure, such as packets, cells, frames, etc. In an embodiment, data units 205 are packets. However, the individual atomic data units upon which the depicted components may operate may be actually be subunits of the data units 205, such as cells or frames. For example, data units 205 may be received, acted upon, and transmitted at a cell or frame level. These cells or frames are logically linked together as the data units 205 (e.g. packets) to which they respectively belong for purposes of determining how to handle the cells or frames. However, the cells or frames may not actually be assembled into data units 205 within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units 205 into a SerDes block, which then outputs the data units 205 serially into an ingress arbiter 220 or other suitable component. On the other end, an egress packet processor may output data units 205 serially into another SerDes block, which the outputs the data units in parallel to ports 290. There may be any number of input and output SerDes blocks, of any suitable size, depending on the specific implementation (e.g. four groups of 4×25 gigabit blocks, eight groups of 4×100 gigabit blocks, etc.).

2.5. Packet Processors

A device 200 comprises one or more packet processors, such as the depicted ingress processor 230 and egress processor 250, that collectively implement forwarding logic by which the device 200 is configured to determine how to handle each data unit 205 that the device 200 receives. These packet processors may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors may be configured to perform different packet processing tasks. These tasks may include, for example, identifying paths along which to forward data units 205, forwarding data units 205 to egress arbiters 260, implementing flow control and/or other policies, manipulating packets, performing statistical or debugging operations, and so forth. A device 200 may comprise any number of packet processors configured to perform any number of processing tasks.

In an embodiment, the packet processors within a device 200 may be arranged such that the output of one packet processor is, eventually, inputted into another packet processor, in such a manner as to pass data units 205 from certain packet processor(s) to other packet processor(s) in a sequence of stages, until finally disposing of the data units 205 (e.g. by sending the data units 205 out an egress port 290, "dropping" data units 205, etc.). The exact set and/or sequence of packet processors that process a given data unit 205 may vary, in some embodiments, depending on the attributes of the data unit 205 and/or the state of the device 200. There is no limit to the number of packet processor(s) that may be chained together in such a manner.

Based on decisions made while processing a data unit 205, a packet processor may, in some embodiments, and/or for certain processing tasks, manipulate a data unit 205 directly. For instance, the packet processor may add, delete, or modify information in a data unit header or payload. In other embodiments, and/or for other processing tasks, a packet processor may generate control information that accompanies the data unit 205, or is merged with the data unit 205, as the data unit 205 continues through the device 200. This control information may then be utilized by other components of the device 200 to implement decisions made by the packet processor.

In an embodiment, a packet processor need not necessarily process an entire data unit 205, but may rather only receive and process a subunit of a data unit, such as a subunit comprising header information for the data unit. For instance, if the data unit is a packet comprising multiple cells, the first cell, or a first subset of cells, might be forwarded to a packet processor, while the remaining cells of the packet (and potentially the first cell(s) as well) are forwarded in parallel to a merger component where they await results of the processing.

Ingress and Egresss Processing

In an embodiment, a packet processor may be generally classified as an ingress packet processor 230 or an egress packet processor 250. Generally, an ingress processor 230 resolves destinations for a traffic manager 240 to determine which ports 290 and/or queues 245 a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward data units 205, implementing flow control and/or other policies, manipulating data units 205, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 may be regulated via an egress arbiter 260 coupled to the egress packet processor 250.

In some embodiments, an egress processor 250 may also or instead be coupled to other potential destinations, such as an internal central processing unit, a storage subsystem, or a traffic manager 240. In an embodiment, multiple egress packet processor(s) 250 may be chained together such that a data unit 205 processed by a first egress packet processor 250 is later processed by a second egress packet processor 250 configured to send the data unit 205 out a specific port 290. There is no limit to the number of packet processor(s) 250 within such a chain.

2.6. Buffers

Since not all data units 205 received by the device 200 can be processed by the packet processor(s) within device 200 at the same time, various components of device 200 may temporarily store data units 205 in memory structures referred to as buffers while the data units 205 are waiting to be processed. For instance, device 200 may include ingress buffers 224 and egress buffers 244, used to buffer data units 205 prior to processing by an ingress processor 230 and egress processor 250, respectively. For instance, a certain egress processor 250 may only be capable of processing a certain number of data units 205, or portions of data units 205, in a given clock cycle, meaning that other data units 205, or portions of data units 205, must either be ignored (i.e. dropped) or stored in egress buffers 244. At any given time, a large number of data units 205 may be stored in the buffers of the device 200, depending on network traffic conditions.

A buffer may be a portion of any type of memory, including volatile memory and/or non-volatile memory. In an embodiment, each buffer comprises many addressable "slots" or "entries" (e.g. rows, columns, etc.) in which data units 205, or portions thereof, may be stored.

A device 200 may include a variety of buffers, each utilized for varying purposes and/or components. Generally, a data unit 205 awaiting processing by a component is held in a buffer associated with that component until the data unit 205 is "released" to the component for processing.

Some or all of the components that utilize one or more buffers may include a buffer manager configured to manage use of those buffer(s). Among other processing tasks, the buffer manager may, for example, allocate and deallocate specific segments of memory for buffers, create and delete buffer entries within that memory, identify available buffer entries in which to store a data unit 205 or portion thereof, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit is received as, or divided into, constituent data unit portions, such as fixed-size cells or frames. The buffers may store these constituent data unit portions separately (e.g. not at the same address location, or even within the same physical or logical bank). The one or more buffer entries in which a data unit 205 are stored are marked as utilized to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to buffers randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different buffers may be utilized to store data units 205 received from different ports 210 or sets of ports 210. In an embodiment, the buffer assignment logic also or instead utilizes buffer state information, such as utilization metrics, to determine which buffer entry to assign to a data unit. Other assignment considerations may include buffer assignment rules (e.g. no writing two consecutive cells from the same packet to the same bank) and I/O scheduling conflicts (e.g. to avoid assigning a data unit to a bank when there are no available write operations to that bank on account of other components reading content already in the bank).

2.7. Queues

In an embodiment, to manage the order in which data units 205 are processed from the buffers, various components of a device 200 may implement queueing logic. For example, the flow of data units through buffers 224 may be managed using ingress queues 225 while the flow of data units through buffers 244 may be managed using egress queues 245.

Each data unit 205, or the buffer locations(s) in which the date unit is stored, is said to belong to one or more constructs referred to as queues. Typically, a queue is a set of memory locations (i.e. in the buffers) arranged in some order by metadata describing the queue. The memory locations may (and often are) non-contiguous relative to their addressing scheme and/or physical arrangement. For example, the metadata for one queue may indicate that the queue is comprised of, in order, entry addresses 2, 50, 3, and 82 in a certain buffer.

In many embodiments, the sequence in which the queue arranges its constituent data units 205 or data unit portions corresponds to the order in which the data units 205 or data unit portions in the queue will be released and processed. Such queues are known as first-in-first-out ("FIFO") queues, though in other embodiments other types of queues may be utilized.

In some embodiments, the number of data units 205 or data unit portions assigned to a given queue at a given time may be limited, either globally or on a per-queue basis, and this limit may change over time.

2.8. Traffic Manager

According to an embodiment, a device 200 further includes one or more traffic managers 240 configured to control the flow of data units 205 to egress processor(s) 250. A traffic manager 240 receives data units 205 from ingress processors 230 and/or other components of device 200. Traffic manager 240 may include or be coupled to egress buffers 244 for buffering data units 205 prior to sending those data units 205 to their respective egress processor(s) 250. A buffer manager within the traffic manager 240 may temporarily store data units 205 in egress buffers 244 as they await processing by egress processor(s) 250. The number of egress buffers 244 may vary depending on the embodiment. A data unit 205 or data unit portion in an egress buffer 244 may eventually be "released" to one or more egress processor(s) 250 for processing, by reading the data unit 205 from the buffer 244 and sending the data unit 205 to the egress processor(s) 250. In an embodiment, traffic manager 240 may release up to a certain number of data units 205 from buffers 244 to egress processors 250 each clock cycle or other defined time slot.

Beyond managing the use of buffers 244 to store data units 205 (or copies thereof), the traffic manager 240 may include queue management logic configured to assign buffer entries to egress queues 245 and manage the flow of data units 205 through the egress queues 245. The traffic manager 240 may, for instance, identify a specific queue 245 to assign a data unit 205 to upon receipt of the data unit 205. The traffic manager 240 may further determine when to release—also referred to as "dequeuing"—data units 205 (or portions thereof) from queues 245 and provide those data units 205 to specific egress processors 250. Buffer management logic in the traffic manager 240 may further "deallocate" entries in buffers 244 that store data units that are no longer linked to egress queues 245. These entries are then reclaimed for use in storing new data through a garbage collection process.

In an embodiment, different egress queues 245 may exist for different destinations. For example, each port 210 and/or port 290 may have its own set of queues 245. The queue 245 to which a data unit 205 is assigned and linked may, for instance, be selected based on forwarding information indicating which port 290 the data unit 205 should depart from. In an embodiment, a different egress processor 250 may be associated with each different set of one or more queues 245. In an embodiment, the current processing context of the data unit 205 may be used to select which queue 245 a data unit 205 should be assigned to.

In an embodiment, there may also or instead be different egress queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 5. As another example, a data unit 205 may be replicated a number of times after it reaches the head of a queue 245 (e.g. for different egress processors 250). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 244, or a single copy of the data unit 205 may be linked from a single buffer location to multiple queues 245 at the same time.

2.9. Ingress Arbiter

A device 200 may further include one or more ingress arbitration components, or arbiters, 220, deployed in front of one or more ingress processors 230. Similar to an egress traffic manager 240, an ingress arbiter 220 controls the flow of data units into an ingress processor 230, and in fact may sometimes be known as ingress traffic manager. Each arbiter 220 comprises or is coupled to an ingress buffer 224. An ingress arbiter 220 may utilize buffers 224 to temporarily store incoming data units 205 before sending them to an ingress processor 230. An ingress arbiter 220 may be configured to always store incoming data units 205 in buffers 224, or only when needed to avoid potential drops at oversaturated downstream components.

An ingress arbiter 220 may store data units 205, or data unit portions, that it receives in entries within one or more ingress buffers 224. Buffers 224 may be stored in a same or different memory than buffers 244. In embodiments where buffers 224 and 244 are the same, ingress buffers 224 and egress buffers 244 may be different portions of that same memory, allocated to ingress and egress operations, respectively.

An ingress arbiter 220 may release up to a certain number of data units 205 from buffers 224 to an ingress processor 230 each clock cycle or other defined period of time. The next entry to release may be identified using one or more ingress queues 225, which function similar to egress queues 245. For instance, each ingress port 210 or group of ports 210 may be assigned an ingress queue 225. Ingress queues 225 may be, for example, first-in-first-out queues. That is, when deciding which data unit 205 in an ingress queue 225 to release next, the data unit 205 that has spent the longest time in the ingress queue 225 is selected.

In embodiments with multiple ingress queues 225, the arbiter 220 may utilize a variety of mechanisms to identify the next ingress queue 225 from which to release a data unit 205. For example, each queue 225 may be assigned one or more slots, and the next queue 225 for a given time period may be selected using a round-robin approach that rotates through these slots. As another example, the next queue 225 may be selected using a random, or probabilistic approach. In an embodiment, each ingress queue 225 may be weighted by an advertised transmission rate. For instance, for every one packet released from a queue 225 for a 200 Mbps port, ten might be released from a queue 225 for a 2 Gbps port. The length and/or average age of a queue 225 might also or instead be utilized to prioritize queue selection. In an embodiment, a downstream component may instruct the arbiter 220 to release data units 205 from certain ports. Hybrid approaches may also be used. For example, one of the longest ingress queues 225 may be selected each odd clock cycle, and a random ingress queue 225 may be selected every even clock cycle. In an embodiment, a token-based mechanism is utilized.

In an embodiment, the next ingress queue 225 from which to release a data unit 205 is decided at least partially based on the ports 210 with which the ingress queues 225 are associated. For example, each port 210 may have a different set of ingress queues 225 for the data units 205 that arrive via that port 210. In a given time period, one or more ports 210 may be selected from which to release a data unit 205. The port(s) 210 may be selected using, for example, a weighted round robin algorithm, where ports 210 are provided bandwidth proportional to their port speed. When a port 210 is selected, one or more ingress queues 225 are selected from the set of queues 225 that is associated with the port 210, using any suitable technique. In an embodiment, for instance, queues 225 are selected using a Strict Priority ("SP") algorithm, weighted deficit round robin ("WDRR") algorithm, or a version of Weighted Fair Queuing ("WFQ") algorithm. A data unit 205 (e.g. the head data unit 205), or a portion thereof, is then release from the selected queue 225.

In an embodiment, ingress queues 225 may also or instead exist for specific groups of related traffic, also referred to as priority sets or classes of service. For instance, all data units 205 carrying VoIP traffic might be assigned to a first queue 225, while all data units 205 carrying Storage Area Network ("SAN") traffic might be assigned to a different queue 225. Each of these ingress queues 225 might be weighted differently, so as to prioritize certain types of traffic over other traffic. Moreover, there may be different ingress queues 225 for specific combinations of ports 210 and priority sets.

Data units 205 released by an arbiter 220 are forwarded to an ingress processor 230 for ingress processing. An arbiter may be coupled to a single ingress processor 230, or multiple arbiters 220 may share an ingress processor 230.

Yet other queue selection mechanisms are also possible. The techniques described herein are not specific to any one of these mechanisms, unless otherwise stated. Note that similar selection techniques may also be applied to selecting data units 205 to release from egress queues 245 during egress processing, depending on the embodiment.

In an embodiment, weights, policies, or strategies for these and other such selection mechanisms may be adjusted, for instance, dynamically in response to analyses of state information and/or data unit information for various components of the device.

2.10. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers 244 are overutilized, a queue 245 is over a certain size, and/or a data unit 205 has a certain characteristic.

2.11. Multiple Pipelines

System 200 illustrates only one of many possible arrangements of components configured to provide the functionality described herein. Other arrangements may include fewer, additional, or different components, and the division of work between the components may vary depending on the arrangement. For example, in some embodiments, the ingress arbiter 220 and ingress packet processor 230, and/or egress arbiter 260 may be omitted. As another example, there may be any number of ports 210/290.

Though only one egress processor 250 and a single traffic manager 240 are depicted in FIG. 2, a device 200 may comprise any number of egress processors 250 and traffic managers 240. For instance, different sets of ports 210 and/or ports 290 may have their own traffic managers 240 and egress processors 250. As another example, in an embodiment, the traffic manager 240 may be duplicated for some or all of the stages of processing a data unit 205. For example, system 200 may include a traffic manager 240 and egress processor 250 for an egress stage performed upon a data unit 205 exiting the system 200, and/or a traffic manager 240 and packet processor for any number of intermediate stages. The data unit 205 may thus pass through any number of traffic managers 240 and/or packet processors prior to exiting the system 200. In other embodiments, only a single traffic manager 240 is needed. If intermediate processing is needed, flow of a data unit 205 may "loop back" to the traffic manager 240 for buffering and/or queuing again after each stage of intermediate processing.

In an embodiment, there may be any number of ingress arbiters 220, each with its own set of queues 224 and buffers 225, and any number of ingress processors 230. Moreover, the number of ingress processors 230 need not necessarily correspond to the number of egress processors 250 within device 200. Nor need the number of egress processors 250 correspond to the number of traffic managers 240 and/or egress arbiters 260.

Figure 3:
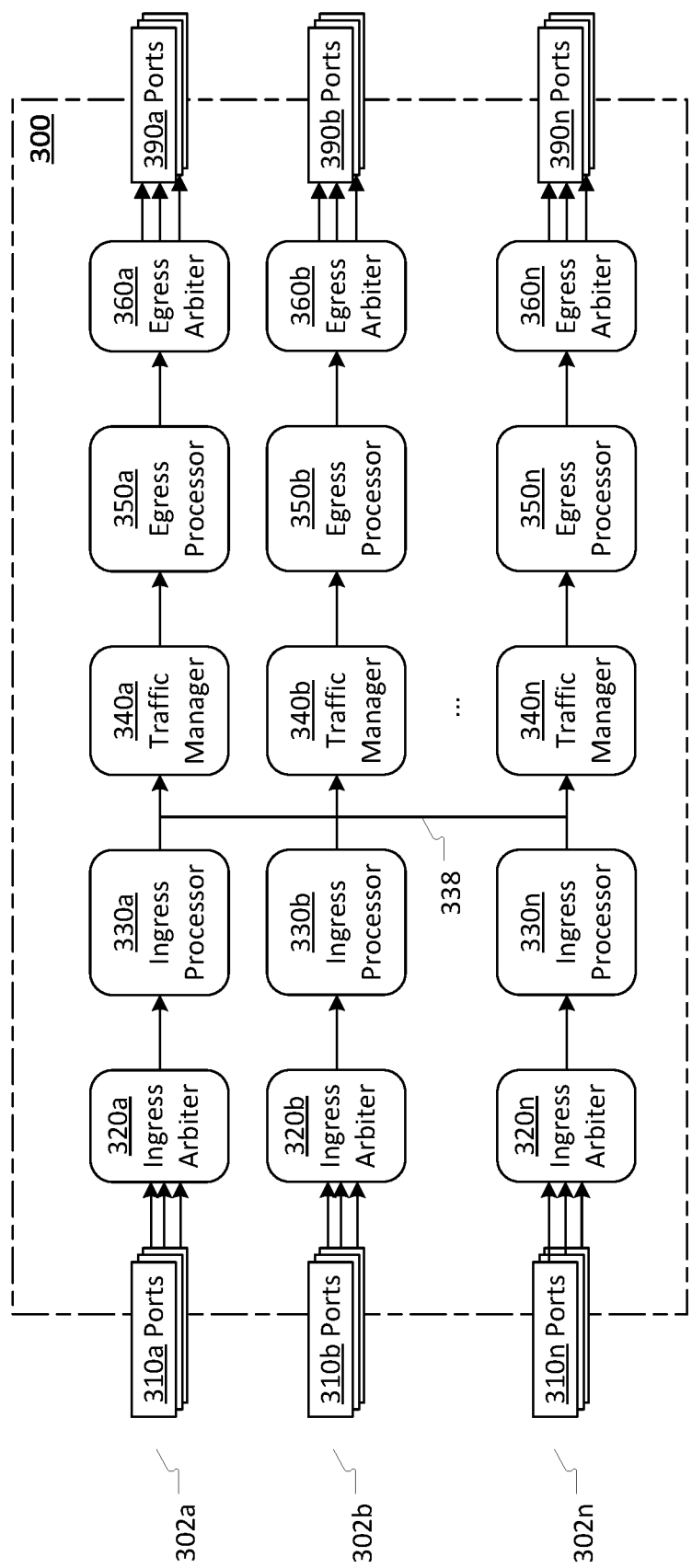
FIG. 3 illustrates an example network device comprising multiple, interconnected pipelines of ports, packet processors, arbiters, and traffic managers.

FIG. 3 illustrates an example network device 300 comprising multiple, interconnected pipelines 302 of ports, packet processors, arbiters, and traffic managers, according to an embodiment. Pipelines 302, depicted as pipelines 302a-n, are each a series of components that process data units 305 received from and/or being sent to a different set of ports 310/390. Each pipeline has its own ingress arbiter 320, ingress processor 330, traffic manager 340, egress processor 350, and egress arbiter 360. For instance, ingress ports 310a are coupled to an ingress arbiter 320a, which is coupled to an ingress processor 330a, which is coupled to a traffic manager 340a, which is coupled to an egress processor 350a, which is coupled to an egress arbiter 360a, which is finally coupled to egress ports 390a, which may be the same physical ports as ingress ports 310a.

To allow for traffic arriving on an ingress port 310 in one pipeline 302 to exit out an egress port 390 in another pipeline 302, the pipelines 302 may be coupled by one or more interconnects. For instance, there may be an interconnect 338 deployed between ingress processors 330 and traffic managers 340, by which data units may be forwarded to a traffic manager 340 on a different pipeline 302 than the pipeline 302 over which the data units arrived. Such an interconnect 338 may be configured to inspect a data unit and/or accompanying control information and, based thereon, determine the appropriate traffic manager 340 to send the data unit to. In another embodiment, a traffic manager 340 may be shared amongst multiple pipelines 302. In other embodiments, there may be any combination of shared traffic managers 340 and/or interconnects 338 in device 300.

There may be any number of ports 310/390 per pipelines, including a single port. Moreover, each pipeline 302 may have more than one arbiter 320, ingress processor 330, traffic manager 340, egress processor 350, and/or egress arbiter 360. In some embodiments, the multiple pipelines 302, or even all pipelines 302 may converge upon a single shared traffic manager 340 (potentially avoiding the need for an interconnect 338), and then diverge again to different egress processors 350. Hence, it will be recognized that a device 300 may comprise any number of such components arranged in a wide variety of arrangements, and the techniques described herein need not necessarily be limited to any specific one or these arrangements.

2.12. Accounting Mechanism

In some embodiments, a networking device such as device 200 or 300 comprises one or more accounting mechanisms. The accounting mechanisms monitor various metrics related to the performance of the components of the network device. For instance, an accounting mechanism may track an amount of buffer space utilized, a size of a queue, an age of a queue, a count of data units that are dropped by a certain component (i.e. "drop counters") over a given period of time, a count of data units or data unit portions that are sent or received at a certain component, an amount of resources utilized by a certain component, a frequency with which a certain component is utilized, a latency associated with a queue or other entity, and so forth. Moreover, such metrics may be tracked at various levels of granularity with respect to various entities, classifications, and so forth. Various statistics may be calculated using such metrics, such as averages, moving averages, rates, maximum or minimum values over time, and so forth. In some embodiments, an accounting mechanism may further capture certain data from data units passing through the device, such as headers and/or other portions of dropped data units.

Furthermore, in some embodiments, an accounting mechanism may determine the device, one of its components, and/or various entities to be in various states based on the metrics and/or statistics. There may be any number of types of states. For instance, for a certain component and/or type of data unit, there may be a normal state corresponding to a first buffer utilization threshold, a congested state corresponding to a second buffer utilization threshold, and an oversaturated state corresponding to a third buffer utilization threshold.

Metrics, statistics, state information, and/or other data generated by an accounting mechanism may be utilized by logic within a networking device to make various determinations, such as whether to drop a certain data unit, whether to implement flow control mechanisms, whether to send a message to another component or network device, and so forth.

In an embodiment, some or all of the components of a network device may include or be coupled to their own accounting mechanisms. For instance, an accounting mechanism may be included in or coupled to each traffic manager 340. A traffic manager accounting mechanism may be configured to, among other tasks, monitor the use of a buffer such as buffer 244, and generate buffer count information based thereon. The buffer count information may be stored in any suitable storage location, and/or communicated to buffer management logic, queue management logic, and/or other components periodically or upon request.

In an embodiment, an accounting mechanism maintains a count that indicates the number of buffer entries and/or amount of buffer space utilized by or available to each of a number of defined logical or physical "entities." The entities may include, without limitation, constructs such as ingress ports, egress ports, queues, priority sets, and/or traffic classes. The entities may, for example, correspond to specific values in the packet metadata, such as the value of a source port identifier field or a queue identifier field.

The buffer count information generated by an accounting mechanism may serve any of a variety of purposes, such as, without limitation, indicating when a queue or other entity's allotment of buffer space in a certain buffer has been exhausted, or when the buffer is experiencing congestion related to that entity. Based on the buffer count information, buffer management logic, queue management logic, and/or other components may be configured to perform various actions, such as, without limitation, dropping certain sets of data units (as opposed to buffering the data units and sending them through queues), enabling rate control with respect to certain sets of data units, performing statistical or debugging operations, and so forth.

In some embodiments, to reduce the expense of an accounting mechanism, the accounting mechanism may only count information at intermittent times (e.g. once every ten clock cycles, once every twenty clock cycles, etc.). The accounting mechanism may, for instance, determine and report updated buffer count information for only a small subset of the entities each clock cycle, with the subset being chosen using a round robin approach and/or based on which entities exhibit a high level of recent activity. Alternatively, or additionally, the accounting mechanism may resolve only an approximate utilization for an entity. A variety of suitable accounting mechanisms exist in which resource utilization, such as per-entity buffer utilization, is tracked on a delayed, staggered, or otherwise approximate basis instead of in real-time.

Figure 4:
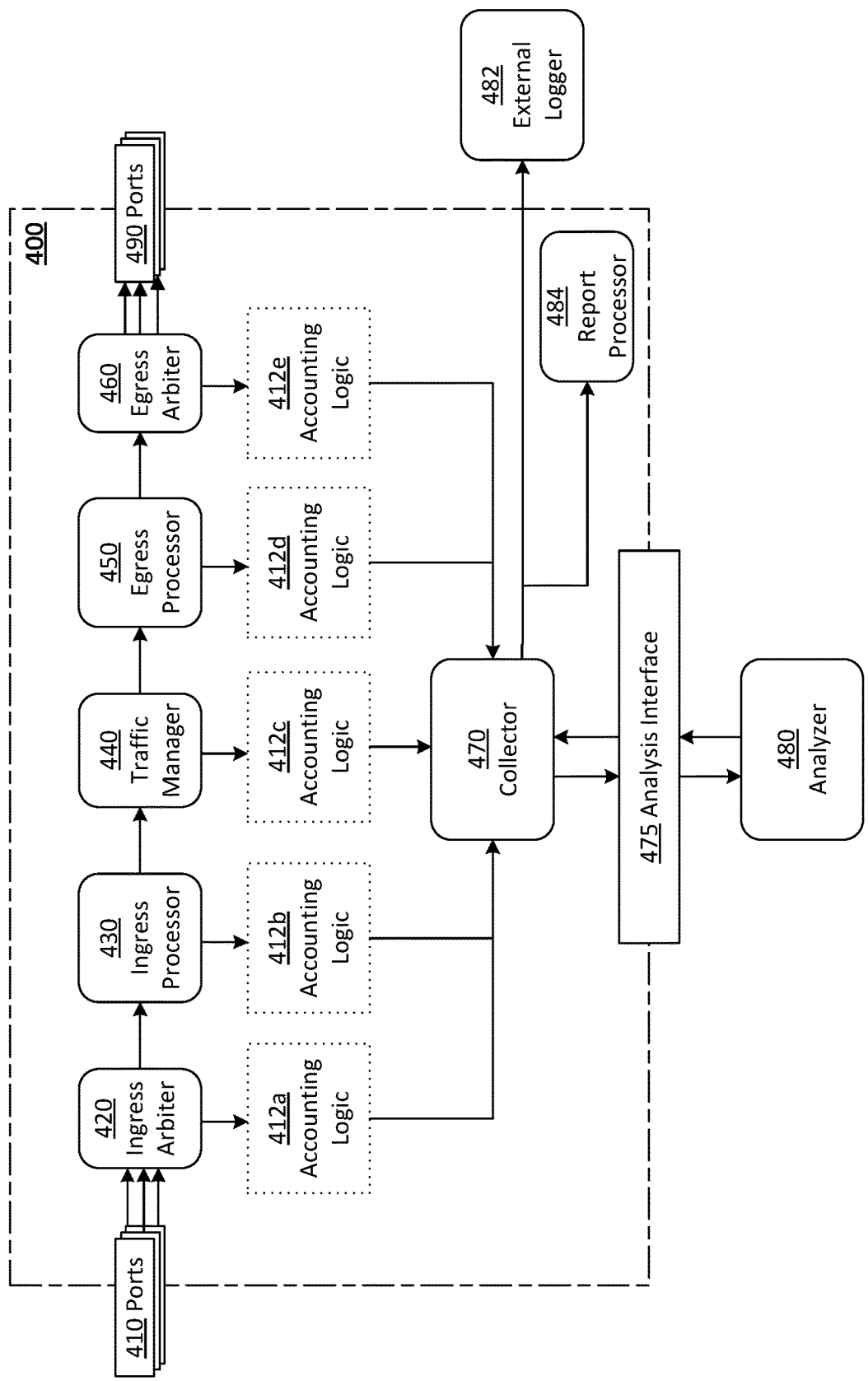
FIG. 4 illustrates a device in which information pertaining to the operations of various components within the device are collected for analysis via an analysis interface.

There may be any number of accounting mechanisms within a device. For example, FIG. 4 illustrates a device 400 in which information pertaining to the operations of various components within the device are collected for analysis via an analysis interface, according to an embodiment. Device 400 may be the same as a device 200 and/or 300, or device 400 may be a separate device. The various components 410-475 of device 400 may be implemented using any suitable combination of hardware and/or software. In an embodiment, device 400 is a chip within a network switch.

As with devices 200 and 300, device 400 comprises ports 410/490, one or more ingress arbiters 420 coupled to various sets of the ports 410, one or more ingress processors 430 coupled to ingress arbiter(s) 420, one or more traffic managers 440, one or more egress processors 450 coupled to the traffic manager(s) 440, and one or more egress arbiters 460 coupled to the egress processor(s) 450. Although one pipeline of components is depicted, it will be recognized that there may by any number of pipelines of components in device 400.

Some or all of the components in device 400 include or are coupled to accounting mechanisms such as described above, which are depicted as accounting logics 412*a-e*. For instance, an ingress arbiter 420 may include accounting logic 412*a*, an ingress processor 430 may include accounting logic 412*b*, a traffic manager 440 may include accounting logic 412*c*, and egress processor 450 may include accounting logic 412*d*, and an egress arbiter 460 may include accounting logic 412*e*. Each instance of a certain type of component may include its own accounting logic. For instance, each traffic manager 440 may include its own internal accounting hardware. Or, an accounting logic 412 may be shared amongst all instances of a certain type of component. For instance, a common accounting logic may be coupled to each instance of egress ports 490.

Not all components of the same type need necessarily have accounting logic 412. For instance, some egress processors 450 for certain types of traffic and/or certain destinations may have accounting logic 412, while others may not. Moreover, not all of the depicted types of components need have an accounting logic. For instance, in an embodiment, ingress processors 430 and/or egress processors 450 may lack accounting logic 412.

The types of information collected and/or generated by an accounting logic 412 may vary depending on the component type with which the accounting logic is associated. For instance, an accounting logic 412 for an ingress arbiter 420 may include a buffer count for an ingress buffer, whereas an accounting logic 412 for an ingress processor 430 might not include any sort of buffer counter.

2.13. Collector

According to an embodiment, device 400 further comprises a collector component 470 coupled to some or all of the accounting logics 412. The collector 470 is configured to receive state information such as metrics, statistics, states, and/or other data generated by accounting logics 412. The collector 470 is further configured to relay this information, or other information generated based thereon, to an analyzer interface 475.

The accounting logics 412 may be configured to stream the data to the collector 470 continuously, or push the data to the collector 470 at various intervals (e.g. every other clock cycle, etc.). Or, the collector 470 may poll the accounting logics 412 for the data at various intervals, and/or read the data from various memories in which the accounting logics 412 write the data. In an embodiment, there may be one or more intermediate collection components by which the collector 470 receives data from the accounting logics 412.

In an embodiment, the collector 470 may be configured to pass some or all of the information it receives from one or more of the accounting logics 412 directly through to the analyzer interface 475. In an embodiment, the collector 470 may comprise or be coupled to one or more memories in which the collector 470 is configured to store certain data received from the accounting logics 412. The collector 470 may then pass some or all of the information on to an analyzer interface 475 over a period of time. The data itself may be aged out of the one or more memories over time (e.g. using a circular buffer).

In an embodiment, the collector 470 may generate additional data based on the data that the collector 470 receives from the accounting logic 412, either in real-time as the data is received, or on a delayed basis (e.g. by reading the data received from the accounting logic 412 in a memory in which the collector 470 has buffered the data). For instance, the collector 470 may aggregate data it receives across multiple components of the same type, or multiple periods of time. Moreover, the collector 470 may transform the collected data by computing other types of statistics, such as rates, moving averages, weighted moving averages, maximum values, minimum values, standard deviations, time domain to frequency domain conversions, compositions thereof, and so forth. The collector 470 may also or instead be configured to determine states of various components, types of components, or the entire device 400. Such data may be passed on directly to the analyzer interface 475 as soon as it is calculated, and/or stored in the afore-mentioned one or more memories for subsequent calculations and/or delivery to the analyzer interface 475.

In an embodiment, the collector 470 may be configured to recognize certain events based on the data the collector 470 receives from the accounting logics 412. For instance, the collector 470 may receive header data from a dropped packet. Based thereon, the collector 470 may generate an event data structure to represent a drop event. The collector 470 may further correlate other data related to an event with the event itself. For instance, the collector may correlate a drop event with a size of queue from which the associated data unit was dropped, a buffer count associated with a source port for the data unit, a latency associated with the queue, an identity of the dropping component, and so forth. The values of these metrics may be included in the event data structure, which may then be passed on as state information to the analyzer interface 475.

In an embodiment, the information that a collector 470 communicates to the analyzer interface 475 may be user-configurable. For instance, the collector 470 may be configured to send latency data to the analyzer interface 475, but not buffer counts. The collector 470 may thus discard the buffer count data without sending it to the analyzer interface 475. The configuration may change over time. Moreover, if the collector 470 collects and/or generates more data than can be communicated over the analyzer interface 475 within a certain period of time, various priority levels may be assigned to types of data. The collector 470 may discard lower-priority data if there is not enough bandwidth to send it to the analyzer interface 475.

Non-limiting examples of data that a collector 470 may send to an analyzer interface 475 include: counters of data units received by a specific component in a recent period of time, drop counters associated with specific queues and/or various components in the pipeline, headers of specific data units (or values of fields found therein) that have been dropped at a specific component or are otherwise of interest, other attributes of such data units or even payloads thereof, buffer counters indicating a number of buffer entries utilized for storing data units that have a specific attribute at a specific component, buffer counters indicating a number of buffer entries utilized for storing data units that are associated with a specific queue or other entity, sizes of specific queues, a maximum queue size in a set of queues, an average queue size in a set of queues, average queue size over a period of time, a standard deviation of a queue size or average queue size over a period of time, per-port utilization, an aggregate device arrival rate, an aggregate device departure rate, a velocity of a queue size or average queue size (i.e. the difference between two consecutive samples of the queue size), an acceleration of a queue size or average queue size (i.e. the difference between two consecutive samples of the velocity), a ratio of data units transmitted versus data units received, data indicating the values of current configuration parameters or tables, frequency domain conversions of queue size or buffer counter changes over time, etc.

Optionally, the collector 470 may be configured to receive data back from the analyzer 475. For instance, an analyzer 480 connected to the analyzer interface 475 may generate statistics, reports, instructions, or other data, and send the data back to the collector 470. The collector 470 may relay this data to a central processor unit attached to a port of the device 400, to another other component within or coupled to the device 400, or to an external data collector coupled to the device 400 via a network.

In an embodiment, there may be multiple collectors 470, each coupled to a different set of accounting logics 412, and each coupled to a different analyzer interface 475. In an embodiment, a single collector 470 may be coupled to multiple analyzer interfaces 475. The collector 470 may send the same data to each interface 475, or different sets of data to different interfaces 475.

2.14. Analyzer

As mentioned above, collector 470 may send various data to an analyzer interface 475. In an embodiment, the interface 475 may be an external interface of device 400, capable of being connected to another device, such as another chip or other hardware. The analyzer interface 475 may or may not be a dedicated hardware interface, depending on the embodiment. For instance, the interface may be, without limitation, pins to an external device, a SerDes, a standard communications port such as ethernet or Serial Periperal Interface, a bus to custom logic (programmable or fixed) within the chip, and so forth.

Via interface 475, device 400 may be connected to an analyzer 480. Depending on the embodiment, analyzer 480 may be a component of device 400, separate hardware, or a combination thereof.

In an embodiment, analyzer 480 may be a separate FPGA, ASIC, or other integrated circuit that is hard-wired to interface 475. For instance, a manufacture of network switching apparatuses might, for certain classes of such apparatuses, hard-wire an analysis component directly to interface 475 on a single board or card, thereby enabling the advanced analysis techniques described herein. For other classes of switches, the manufacturer might not make such a connection, and thus collector 470 might sit unutilized in these apparatuses.

In other embodiments, analyzer 480 is a modular device that may be "plugged in" or otherwise connected to analyzer interface 475 on an as-needed basis. For instance, to diagnose certain problems on a network and/or with respect to a particular switch, a consumer might plug an analyzer 480 into the analyzer interface 475, or into a common system bus by which the analyzer interface 475 is implemented. Once the analyzer 480 fulfills its function, the analyzer 480 might subsequently be removed from the device 400, and even connected to a different device 400.

In an embodiment, there may be more than one type of analyzer 480, and different types of analyzers 480 may be connected to or otherwise coupled to a device 400 for different purposes.

An analyzer 480 may be connected to more than one analyzer interface. For instance, a switch may have multiple devices 400, and a single analyzer 480 may be connected to all of the analyzer interfaces 475 of the switch at the same time. In an embodiment, an analyzer 480 may be connected to one or more analyzer interfaces 480 via common system bus rather than a direct physical connection.

Analyzer 480 is configured to utilize information received over the analyzer interface 475 to log information about the operations of the device 400 and, based on one or more logic-implemented analyses thereof, generate various reports and/or take various corrective measures, depending on the embodiment. Reports may, for instance, report status information for various components of the device 400 (e.g. current states or statistics), diagnose errors, misconfigurations, or other potential problems with the device 400, and/or, in some embodiments, further suggest actions to remedy the problems. Analyzer 480 may passively receive information from collector 470 via the interface 475, or may actively request such information.

In an embodiment, the analyzer 480 may include or be coupled to a data store in which the analyzer is configured to log the information from collector 470, or other data calculated thereon. As with collector 470, the analyzer 480 may generate any suitable statistics or other state information based on the information from collector 470, which may then be stored and/or further analyzed.

In an embodiment, the analyzer 480 is configured to recognize certain events and/or patterns in the information it receives from a collector 470. In an embodiment, some associations between events and patterns may be pre-programmed into analyzer 480 as a fixed set of rules. For instance, a rule may indicate that when a specified component is in specified state with a specified metric value for a specified amount of time, a specified event is deemed to have occurred.

Certain patterns or events may be associated with specific errors, misconfigurations, and/or actions that the analyzer 480 may suggest in response to the patterns or events. For instance, a pattern in certain metrics may be associated with a likelihood of congestion in future traffic. The analyzer 480 may therefore generate a report that predicts a future error in the operations of the network device based on the likely congestion. Alternatively, in embodiment, in anticipation of such congestion, the analyzer 480 may be configured to suggest turning on flow control for a certain traffic flow, issue a pause command to certain traffic source, reconfigure a forwarding table, or take other remedial measures.

As another example, a certain error event, such as dropping a certain type of data unit, may be indicative of a misconfiguration of the device 400. Analyzer 480 may be configured to suggest alternative configurations that would not produce the event.

A variety of actions may be associated with patterns or events, such as, without limitation, reconfiguring a forwarding table (e.g. adding, removing, or reweighting paths), turning on flow control for certain classes of traffic, implementing or adjusting traffic shaping policies, prioritizing certain traffic flows, etc.

Report Logging and Processing

As mentioned, the analyzer 480 may be configured to generate reports based on its analyses. The report may include, for example, one or more of an error message diagnosing an enumerated problem at the device 400, an enumerated state of device 400 or a component thereof determined by the analyzer 480 (e.g. characterizing the health of the device or other status information), a suggested configuration change or other action, a table of calculated metric values, data visualizations, and so forth.

Optionally, the analyzer 480 may be configured to communicate such reports to a user via a user interface, such as, without limitation, a web-based graphical user interface, command prompt, application programmatic interface ("API"), or even a monitor connected to the analyzer 480 or device 400. Reports may be presented to a user using any suitable presentation, visualization, or data mining techniques.

In an embodiment, the analyzer 480 may utilize collector 470 as a proxy for injecting data units into a pipeline within device 400 to carry reports, notifications generated based on the data in such reports, and/or user interfaces into the network. In this manner, for instance, the collector 470 may provide network access to a web server, email server, command-line interface, or other suitable interface hosted directly within the analyzer 480. Alternatively, analyzer 480 may also be coupled directly to an ingress port 410 by which the analyzer 480 may inject data units into the network without using collector 470.

In an embodiment, the analyzer 480 may be configured to send reports, statistics, or other data to other device components and/or to an external data collector, such as the depicted external logger component 482. The external logger may be in the form of, for example, an external CPU, microcontroller, FPGA, report encapsulation and transmission unit, or other suitable external device or component that has network access, a video interface, or another suitable mechanism for interfacing with a user. At such a component, reports, or data derived therefrom, may be stored in a data repository, whose data may be made accessible using any of a variety of database interfaces, APIs, or software clients. In an embodiment, such an external logger 482 may be configured to generate notifications or alerts in response to certain reports or types of reports, thereby bringing a report by the analyzer 480 to the attention of a network administrator or network administration software.

As mentioned, analyzer 480 may be configured to output a suggested action. Actions suggested in a report may be brought to the attention of a human user using any suitable means, such as via notification messages or a web interface. Alternatively, some or all actions may be triggered automatically, without human input. For instance, analyzer 480 may be configured to communicate, via collector 470 or other suitable means, with a report processor 484.

The report processor 484, which may be internal to or external to device 400, depending on the embodiment, may be capable of reconfiguring one or more devices 400. Analyzer 480 may send instructions to the report processor 484 that instruct the report processor 484 to take the suggested actions, such as changing forwarding tables, manipulating or dropping packets, adjusting the priority of certain traffic flows, modifying data unit selection algorithms, etc. A report processor 484 may be configured to always execute actions suggested by the analyzer 480, or to only execute certain types of actions and/or only under certain conditions.

In an embodiment, the report processor 484 may be configured to identify suggested actions based on data in reports from the analyzer 480, without being explicitly instructed to take an action.

In an embodiment, analyzer 480 may comprise its own report processor 484 by which analyzer 480 is configured to directly reconfigure device 400 via the analyzer interface 475 or another interface back into device 400.

Neural Network

In an embodiment, analyzer 480 may include logic for implementing one or more neural networks or other machine-based learning systems. Such systems perform machine-based analyses of the data received by the analyzer 480 using various computationally-intensive complex calculations in a process commonly referred to as "inference." Based thereon, analyzer 480 may identify patterns or events of interest, classify such patterns and events, generate reports of its analysis, and potentially associate actions therewith. For instance, analyzer 480 may be or include any of a number of commercially available artificial intelligence chips configured for such tasks. Or, a neural network may be implemented using any other combination of hardware and software.

A neural network within the analyzer 480 comprises a set of inputs, also referred to as features. Each input may correspond to a specific metric, attribute, configuration setting, or other type of data that the analyzer 480 is configured to receive from the collector 470. Or, an input may be derived therefrom. Each input is considered to be a "node" within the neural network. The neural network may optionally comprise one or more additional layers of interconnected nodes, also referred to as "hidden nodes" or "latent features." The neural network further comprises an output node, which corresponds to the "result" of the analysis. The output may be, for instance, a specific value, which may in some cases be mapped to a specific label, action, recommendation, or other construct.

The neural network further comprises weights associated with the input nodes and hidden nodes, and/or with transitions between nodes. The weights are generally multiplied or otherwise used to adjust values received at the various nodes of the neural network. For instance, the weights may be seen as indicating the importance of a node in classifying the current state of device 400. In some embodiments, the weights are pre-programmed into the analyzer 480 based on a learning process commonly known as "training." In an embodiment, the analyzer 480 may receive various updates which adjust these weights, and potentially even the structure of the neural network. In an embodiment, the analyzer 480 may be configured to continue the learning process by adjusting its own weights over time based on feedback from device 400 and/or a human supervisor.

The afore-mentioned training process may be implemented using any suitable machine learning technique. For instance, in an embodiment, device 400 may be added to a test network and configured in a manner that is known or believed to be optimal for the network. Various test network traffic loads may pass through the device 400. A problem may be introduced into the device 400, or the network as a whole. For instance, a configuration setting may be adjusted in a less-optimal manner. A collector 470 captures metrics and other state information while this problem exists. The analyzer 480 may then be fed this state information, and taught that it corresponds to the problem. If, for instance, the problem is a misconfiguration, the analyzer 480 may further associate the problem with the solution of changing the configuration setting back to its optimal setting. This process may be repeated over time with different traffic patterns and/or for other problems.

According to an embodiment, there may be more than one neural network within the analyzer 480. Each neural network may or may not use the same inputs, though generally their weights will differ, as will the meaning of their outputs. For instance, there may be one neural network for resolving misconfigurations in the device 400, another for anticipating certain types of traffic problems, and another for an application-specific packet manipulation.

In an embodiment, the analyzer 480 comprises a controller. The controller may perform various tasks such as receiving data from the analyzer interface 475, relaying data to one or more neural networks, normalizing or deriving input feature values before inputting they are inputted into the neural network(s) or other analysis logic(s), formatting or transforming outputs of the neural network(s) or other analysis logic(s) into reports suitable for human and/or machine consumption, sending such reports to the collector 470 and/or to other targets, generating and/or sending instructions to perform certain actions back to the collector 475, and so forth.

Programming the Analyzer

In an embodiment, rules, neural networks, and/or other aspects of the analysis logic implemented by analyzer 480 may be reprogrammed over time. For instance, a switch manufacturer may release new firmware or software that runs on analyzer 480 that improves the ability of analyzer 480 to recognize and/or respond to certain types of traffic.

The analysis logic may further be reprogrammed in context-specific manners. For instance, a consumer may program an analyzer 480 with rules specific to a type of network environment in which the consumer wishes to utilize device 400. The consumer may derive the rules himself or herself, or a manufacturer of the device 400 and/or analyzer 480 may make different firmware or software packages available for different configurations.

Similarly, a manufacturer or consumer may train neural networks in different test environments reflecting different network configurations. Each neural network may have different weights and, potentially, different features. The consumer may choose to reprogram analyzer 480 to use a different neural network depending on the context in which the consumer wishes to utilize device 400.

2.15. Device Control Logic

According to an embodiment, a network device such as devices 200, 300, and/or 400 may comprise device control logic configured to adjust various settings of the device. The device control logic may include one or more control interfaces by which it may receive instructions to make the adjustments. For instance, the device control logic may include a user interface, such as a command line interface, or graphical user interface. In an embodiment, the device control logic may include one or more application program interfaces ("APIs") by which it may receive instructions. Such instructions may be received directly from a coupled data collector, report processor, or analyzer. In an embodiment, such instructions may be relayed from an analyzer device through the data collector.

Such settings may include, for instance, voltages or operating frequencies of various device components, including memories, processors, or and/or other hardware within the device. Voltage changes or frequency changes may be made for all components, all components of a certain class (e.g. all packet processors, or all traffic manager buffers), all components in a certain pipeline, or specific sets of components (e.g. a specific buffer, packet processor, or port). Settings may further include, for instance, the application of certain flow control or traffic shaping policies. Settings may further include weights assigned to queues (e.g. how often a certain queue releases data units to a packet processor), flows (e.g. the priority of a certain flow of traffic), or classes of traffic (e.g. how frequently multicast traffic should be dropped). Settings may further include amounts of buffer space allocated to traffic flows, ports, queues, or other entities at one or more components. Settings may further include whether a certain port or other component is active. Settings may further include changes to paths and forwarding tables.

In an embodiment, the device control logic may be a centralized component responsible for adjusting settings across the entire device. In another embodiment, the device control logic may be distributed amongst the various other components of the device. For instance, each component of the device may have its own device control logic.

2.16. Miscellaneous

Device 400 illustrates only one example of a device in which the techniques described herein may be practiced. Other devices may include fewer and/or additional components in varying arrangements. For instance, a device 400 may lack an ingress arbiter 420, ingress processor 430, and/or egress arbiter 460. Moreover, while only one pipeline of components is depicted, there may be any number of pipelines, each associated with a different set of ports, and each interconnected as described with respect to FIG. 3.

Example architectures for a network device 200, 300, and/or 400 are further described in, without limitation, U.S. patent application Ser. No. 15/433,825, filed Feb. 15, 2017, U.S. patent application Ser. No. 16/033,680, filed Jul. 12, 2018, and U.S. patent application Ser. No. 16/057,354, filed Aug. 7, 2018, the entire contents of each of which are hereby incorporated by reference for all purposes, as if set forth herein. Although any mechanism may be used for monitoring and generating state information, some examples of flexible such mechanisms, adapted for use inside such network architectures are the Programmable Visibility Engines described in U.S. patent application Ser. No. 15/410,651, filed Jan. 19, 2017, the entire contents of each of which are hereby incorporated by reference for all purposes, as if set forth herein.

For simplification, the traffic managers, packet processors, arbiters, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the flows described below may be performed in a variety of systems, including in systems that include device 400, analyzer 480, and/or other devices described above. In an embodiment, each of the processes described in connection with the functional blocks described below may be implemented using one or more integrated circuits, computer programs, other software elements, and/ or digital logic in any of a general-purpose computer or a special-purpose computer, while performing data retrieval, transformation, and storage operations that involve interacting with and transforming the physical state of memory of the computer.

3.1. Monitoring Device Components

Figure 5:
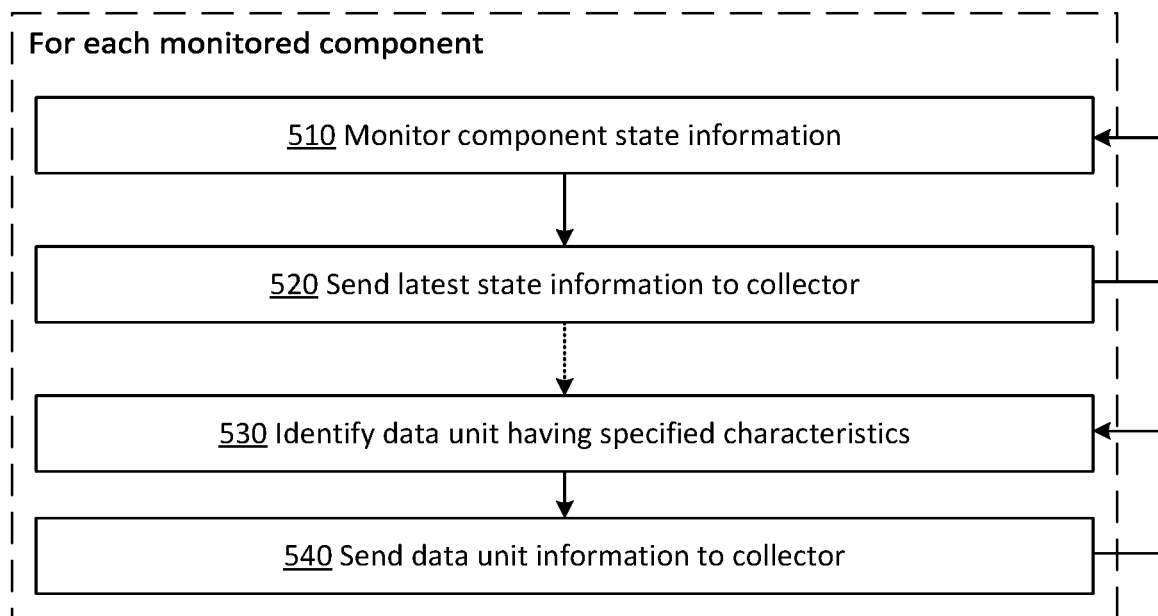
FIG. 5 illustrates an example process flow for monitoring state information and data unit information associated with components within a network device.

FIG. 5 illustrates an example process flow 500 for monitoring state information and data unit information associated with components within a network device, such as within device 400, according to an embodiment. Flow 500 may be performed, for example, by accounting logic associated with any component within a network device, such as with an ingress port, ingress arbiter, ingress processor, traffic manager, egress processor, egress arbiter, and/or egress port. Flow 500 is performed concurrently for each monitored component within the device, and may be repeated continuously throughout operation of the device, or performed only when the device or component is a certain state or mode.

Block 510 comprises monitoring component state information. The state information may include, for instance, metrics associated with component resources and component utilization levels. The state information may also or instead include, for instance, enumerated states that characterize the current operations of the component and/or condition of its resources. The monitored state information may be global and/or specific to specific entities.

The monitoring may comprise, for instance, incrementing counters associated with buffers and/or queues whenever the component places new data units in the buffers and/or queues. The monitoring may further comprise decrementing the counters whenever the component removes the data units from the buffers and/or queues. Similar counters may be kept for other resources associated with the component. The monitoring may further comprise tracking a rate at which data units are received and/or depart from the component. Counters and other metrics may be stored in any suitable memory.

In an embodiment, for some metrics, there may be multiple levels of counters. Intermediate counters may be updated each time a resource is allocated or deallocated, and the intermediate counters may be aggregated less frequently to resolve the total amount of resources being utilized. In an embodiment, rather than maintaining a counter that is updated each time a data unit arrives or departs from the component, a size or other amount of resource utilized may be sampled at various intervals through an accounting or auditing process. In view of these and other alternative accounting mechanisms that may be utilized, it will be recognized that, at any given time, the most current values of the monitored metrics may in fact lag behind the actual amounts of resources being utilized to various extents.

In an embodiment, the monitored metrics may include other types of metrics, such as a moving average of specific counters. Component states, such as "normal" and "congested," may also me calculated based on comparing counters and/or other metrics to various state thresholds. The latest state may be stored in a suitable memory, and utilized for various internal purposes such as flow control, forwarding decisions, etc. Of course, calculated metrics and states may also or instead be derived by a collector or analyzer.

In an embodiment, the state information may further include event data. For instance, a component may receive an instruction to pause some or all traffic passing through it, or apply traffic shaping to a certain traffic flow. A data structure describing this event and a time at which it occurred may be generated as part of the state information. Similarly, an event may be generated when a data unit is dropped. A variety of other types of events may be captured. Some events may be derived based on existing state information, though such functionality may be better suited for the collector or analyzer.

Block 520, which may be performed concurrently while the state information is being monitored in block 510, comprises sending the latest state information to a collector, such as collector 470. Block 520 may be performed any time the metric values and/or states are updated in block 510, at regular intervals, and/or whenever requested by the collector, depending on the embodiment. The state information may be sent using any suitable format or protocol. Not all of the state information gathered for the component need be sent to the collector, nor need the state information that is sent be sent all at the same time. In an embodiment, rather than actively sending data to the collector, the collector may read the state information from a memory to which it was written in block 510.

Concurrently with monitoring state information in blocks 510/520, in block 530, accounting logic coupled to the component may further and optionally identify a data unit, received or processed by the component, that has a specific characteristic. For instance, the data unit may be a data unit that the component has decided to drop. Or, the data unit may belong to a certain traffic flow, come from a particular source port or address, be destined for a particular source port or address, have a certain value for a certain field of the data unit header, have certain payload data, a certain size, or have any other attribute specified to be of interest.

Different accounting logic may be configured to monitor for data units of different characteristics. In an embodiment, at least some of the specified characteristics may be user-configurable.

Block 540 comprises sending information about the identified data units to the collector. The information may simply be that a data unit, or a specific number of data units, having the specified characteristic were encountered at the component in a certain period of time. As another example the information may be a size of a data unit, or a value of a specific field of the data unit, may be sent. In an embodiment, the information may be a copy of at least a portion of the identified data unit, such as of a data unit header or of a certain number of cells of the data unit.

Information for all data units having the specific characteristic may be sent to the collector, or just a sampling thereof. For instance, every fifth data unit dropped from a particular traffic flow may be sent to the collector. The sampling frequency may, in some embodiments, be user configurable. The accounting logic may search for different sets of specified characteristics, and information about data units having certain specified characteristics may be sampled more frequently than data units having other specified characteristics.

Optionally, where a copy of at least a portion of the data unit is sent, that portion of the data unit may be annotated or otherwise marked with certain information, such as the source component, an identifier of a reason the data unit is being sent to the collector, or current state information for with a specific entity associated with the data unit.

Flow 500 illustrates only one example of a flow for monitoring state information and data unit information at a component in a network device. Other such flows may include fewer and/or additional elements, in varying arrangements. For instance, in one embodiment blocks 510-520 are optional, while in another, blocks 530-540 are optional.

3.2. Collecting State Information

Figure 6:
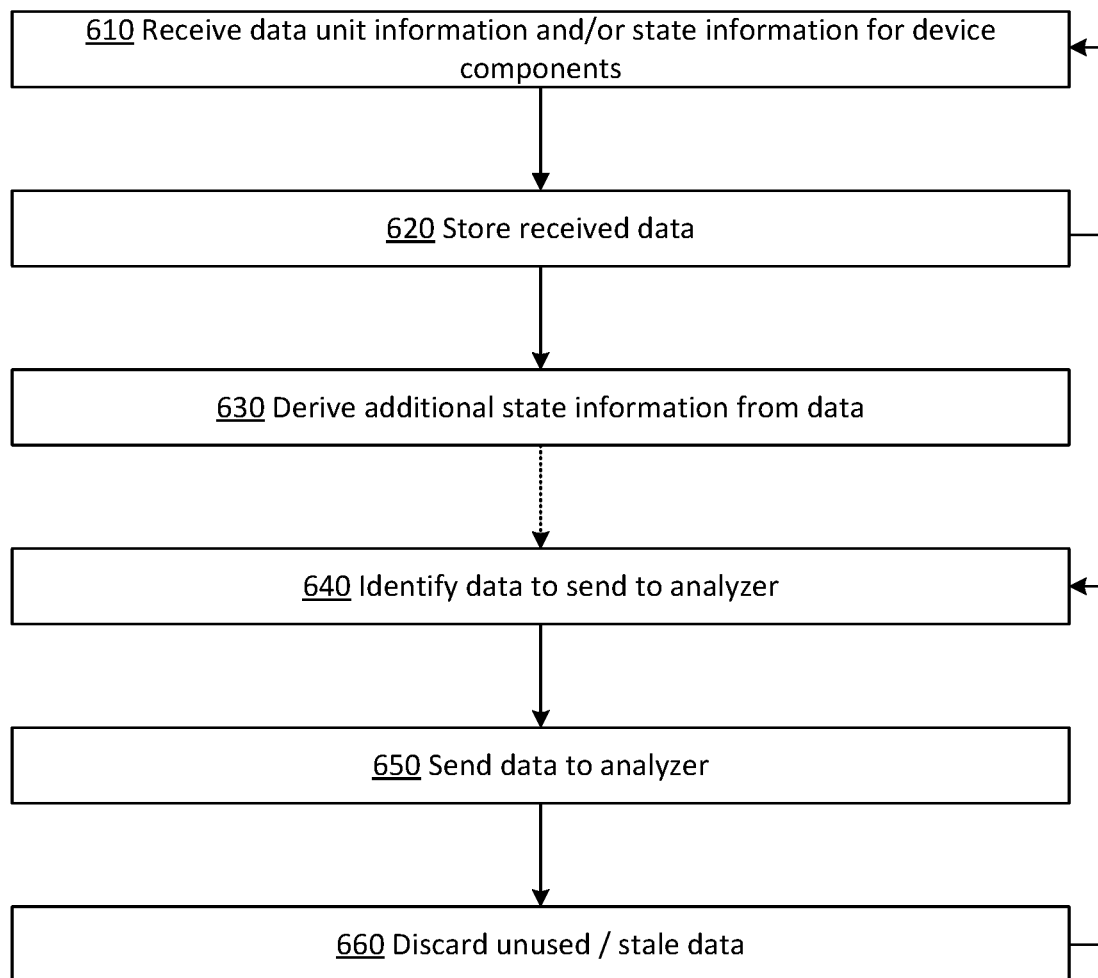
FIG. 6 illustrates an example process flow for collecting data unit information and/or state information associated with components within a network device.

FIG. 6 illustrates an example process flow 600 for collecting data unit information and/or state information associated with components within a network device, such as device 400, according to an embodiment. Flow 600 may be performed, for example, by a collector component, such as collector 470, or by any other suitable component.

Block 610 comprises receiving data unit information and/or state information for specific device components, such as that generated in performance of flow 500. For instance, the collector may be coupled to various accounting logics that are in turn coupled to the components and configured to execute flow 500. Hence, in an embodiment, flow 600 may be performed concurrently with flow 500. In another embodiment, however, flow 600 may be practiced without the specific details of flow 500. For instance, the collector may receive data unit information and/or state information through other means, such as direct interaction with device components and/or resources, and/or interaction with one or more intermediary component.

Block 620 comprises storing the received data. For instance, the collector may include one or more memories in which the latest state information and/or data unit information is temporarily buffered.

Block 630 comprises deriving additional state information from the received data. Deriving additional state information may include, for instance, calculating additional metrics. Examples of additional metrics are found in other sections. Deriving additional state information may further include classifying the existing state information as indicating an enumerated state. Deriving additional state information may further include deriving events by, for instance, determining that the state information and/or data unit information received or derived thus far fit a pattern that has been specified to indicate a certain event. Depending on the embodiment, the additional state information and/or events may also be buffered at least temporarily.

Block 640 comprises identifying data to send to an analyzer, such as analyzer 480. Identifying the data may comprise, in some embodiments, receiving a request for a specified set of the data stored and/or derived by the collector. The request may request that the collector send a set of data once, or continue sending the most current values for that set of data at a certain interval indefinitely. In other embodiments, the data to send to the analyzer may be pre-configured. For instance, any time the collector receives information for a dropped data unit, the collector may be programmed to send a certain set of data to the analyzer. The set of data sent to the analyzer may, in some embodiments, be reconfigured over time.

In yet other embodiments, all data generated and/or stored by the collector may be sent to the analyzer, in which case block 640 may be a trivial step. However, if there is too much data to send to the analyzer in a given time period, different types of data may be prioritized, and only the highest priority types of data sent.

Block 650 comprises sending the data to the analyzer, via an analyzer interface. The data may be sent using any suitable protocol and/or formatting.

Block 660 comprises the collector discarding unused and/or stale data. For instance, the data stored by the analyzer may be discarded as soon as it is sent, after a certain amount of time, or whenever additional space is needed to store newer data (e.g. using a circular buffer).

Flow 600 illustrates only one example of a flow for collecting state information and/or data unit information for components in a network device. Other such flows may include fewer and/or additional elements, in varying arrangements. For instance, in one embodiment blocks 620 and 630 are omitted, and the data received in block 610 is passed directly through to the analyzer.

3.3. Analyzing State Information with a Neural Network

Figure 7:
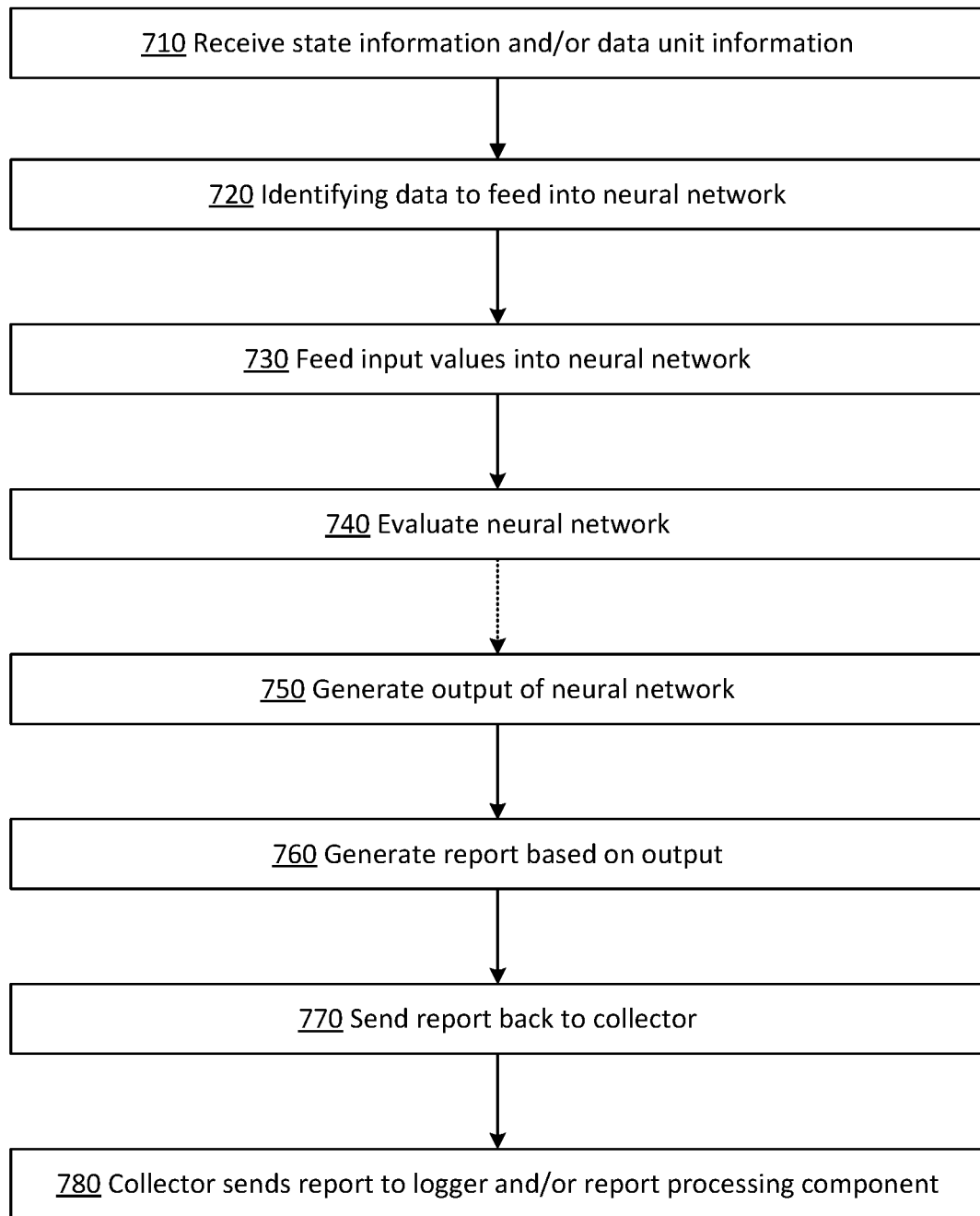
FIG. 7 illustrates an example process flow for analyzing state information for components of a network device using a neural network.

FIG. 7 illustrates an example process flow 700 for analyzing state information for components of a network device using a neural network, according to an embodiment. Flow 700 may be performed, for example, by an analyzer, such as analyzer 480, or by any other suitable component.

Block 710 comprises receiving state information describing the state of one or more components of the network device and/or information describing a data unit of interest. Such information may be, for instance, information sent from a collector in performance of block 660 above. The state information may include any monitored or calculated metrics described herein, as well as enumerated states and/or events. The data unit information may be information within or describing a data unit that has been dropped, or that has other specified characteristics.

Block 720 comprises identifying data to feed into a neural network. For instance, certain data received in block 710 may be mapped to input features of the neural network. In an embodiment, there may be multiple neural networks, and some data is fed into one neural network while other data is fed into another neural network. In an embodiment, block 720 may further comprise deriving one or more features from the data received in block 710, using various algorithms. In an embodiment, all data received by the analyzer is fed directly into a neural network, and hence block 720 may be a trivial step.

In an embodiment, block 720 may be performed whenever new data is received. In an embodiment, block 720 is performed periodically, based on the latest values that have been received. In an embodiment, block 720 is performed in response to receiving data indicating a certain triggering event, state, or data unit.

Block 730 comprises feeding the input values identified in block 720 into the neural network. Block 740 comprises evaluating the neural network based on the input values. Block 750 comprises generating an output for the neural network. The evaluating may comprise any suitable technique for evaluating a neural network. For instance, each node in the network may have one or more associated inputs, whose values are fed into the node. An output is then calculated for the node using the input(s) and one or more specified weights for the node. The output for the node is then either passed as input to another node, or said to be the output of the neural network, per block 750.

Block 760 comprises generating a report based on the output. The report may take a variety of forms, depending on the embodiment. For example, the report may be a simple message that encapsulates the output value generated in block 750. In an embodiment, the report may carry information that is mapped to the output value generated in block 750, such as a state, error message, event identifier, suggested course of action, and so forth. In an embodiment, the report may comprise other information, such as the values of one or more metrics that were input into the network, a data unit identifier or traffic flow identifier for a data unit whose information was fed into the network, outputs of one or more other neural networks that ran concurrently with the neural network of blocks 730-750, values of other metrics calculated based on data received by the analyzer, the most current values of certain metrics that were not input into the neural network, a log of recently received state information, a data visualization generated based on recently received state information, and so forth.

Block 770 comprises sending the report to a collector, which in some embodiments may have been the source of the information in block 710. Block 780 comprises the collector relaying the report to a logger or report processing component, such as logger 482 or report processor 484. Such a component may log the report, or data in the report, generate a notification based on the report, execute an action indicated by the report, or take any other suitable measures in response to receiving a report.

Flow 700 illustrates only one example technique for analyzing state information for components of a network device. Other flows may include fewer and/or additional elements in varying arrangements. For instance, instead of relaying the reports through the collector in block 770, the reports may be delivered directly to a logger or report processing component. In yet other embodiments, the generated outputs or reports are logged or processed directly at the analyzer and not relayed through the collector 470. In an embodiment, different types of analysis logic may be used instead of the neural network of blocks 730-750, including other machine-based learning analysis logic, rule-based analysis logic, and so forth.

In an embodiment, instead of generating an actual report, the output of the neural network results directly in device updates, such as changes to throughput levels, power settings, delay settings, or other configurations of the network device. As updates to the device are made, the data inputted into the neural network will change as a consequence, and the device may be updated again. This feedback element, in essence, may permit the combination of the analyzer and the collector act as a controller for aspects of the configuration of the network device.

4.0. Use Cases

Although inventive on their own, the systems and techniques described herein have a variety of applications, which may feature additional inventive elements. A number of example use cases illustrating these applications are now described.

4.1. Resolving Device Misconfigurations

Conventionally, when a device drops data units, network administrators must discover themselves, through various network logs, that the data units are being dropped, then inspect the various drop counters within the dropping device to identify where the data units are being dropped, and then perform a lengthy analysis of the dropped data units to determine possible reasons for the dropped data units.

Such an analysis may instead be automated by an analyzer coupled to the dropping device, such as described herein. Drop counters and data unit attributes of dropped data units may be inputted into a neural network, at the analyzer, that has been trained to diagnose errors that may lead to dropped data units. The output of the neural network may be an identifier associated with a label that indicates to a network administrator the most likely cause of the dropped data units. A report with the label in it may be sent to the network administrator as soon as the drop occurs.

In an embodiment, the report may further include a suggested solution for the error indicated by the label. For instance, the analyzer may further be fed, or capable of accessing, configuration parameters of the device, which are then fed to a same or different neural network. The output of the neural network may indicate a most likely configuration change that will fix the error. For instance, based on the data networks upon which the analyzer was trained, the analyzer may suggest that a certain field in a certain forwarding table should be changed to a certain value to better optimize performance of the device. Such an analyzer may be trained, for instance, by placing the analyzer in an optimally configured data network, iteratively changing certain configuration parameters to be less optimal, and observing the results.

In an embodiment, instead of sending the report directly to a human operator, a report processor may ingest the report and automatically implement the change. In an embodiment, if the change does not produce the desired result, the change may be rolled back, and another suggested change may be made, or the report may be sent to a human operator.

4.2. Anticipating Traffic Patterns

In an embodiment, attributes of data unit metrics related to queue sizes may be inputted into a neural network. The output of the neural network may indicate the probability that an error or other anomalous event will occur in an upcoming time period, such as congestion or packet loss. For instance, the neural network may be trained to recognize that, when certain queues are of a certain size and a data unit having a certain attribute are received, traffic belonging to the same traffic flow as the data unit are highly likely to be dropped, or a certain ingress port is highly likely to be flooded with traffic. Based on the prediction, various preventative measures may be taken.

4.3. In-Network Application-Specific Traffic Manipulation

Switches in data centers and other networks are conventionally unaware of the application-specific meaning of the data carried by the data units that they handle. In an embodiment, however, the coupling of an analyzer to such switches may permit in-network application-aware actions, thus moving application-specific logic from servers at the edge of the network to the switches inside the network. An analyzer coupled to a device such as device 400 may be configured to recognize application-specific data in data units it receives from a collector and, based thereon, determine when to drop, edit, or otherwise manipulate certain application-specific traffic processed by the device. Because this capability is moved in-network, among other aspects, certain application-related decisions may be made more quickly than they would if the logic rested solely on the edge of the network, potentially increasing the reaction time of the application, reducing unnecessary traffic on the network, and/or reducing demands on computing resources on the edge of the network.

For instance, one application that may run on top of a network is a high-frequency trading platform. Data units in such a network may carry application-specific messages such as a data feed of prices and/or other market information, as well as orders. Accounting logic at a traffic manager or other component within a network device may be configured to forward data units (or portions thereof) to the collector. The collector may relay this information to the analyzer. The analyzer may parse and log the latest market information (and/or metrics derived therefrom) from data units that carry market information.

Whenever a data unit carrying a new order is received, the analyzer may feed logged market information, as well as particulars of the order (e.g. price, quantity, symbol, etc.), into a neural network. The neural network may output a value that indicates a level of risk associated with the order. If the level of risk is above a specified threshold, the analyzer may send an instruction to the device to drop the data unit that carries the new order. The analyzer may further be configured to train the neural network using the order and future market information, to improve its performance over time.

Of course, a high-frequency trading platform is only one example of application-aware logic being executed by an analyzer as described herein. Other application-aware logic may similarly be implemented at the analyzer. Moreover, application-specific logic need not necessarily rely on a neural network, but may rather rely on various rules sets or other decision-making mechanisms.

In an embodiment, to reduce the number of data units that are passed to an analyzer, the accounting logic or collector may be configured to identify types of data units that are of interest to the application-aware analyzer. For instance, the accounting logic or collector may be configured to only pass on data units that have one or more specified values in a specified header field. The value(s) may be specified, for instance, by the analyzer or an operator of the device.

In an embodiment, a manufacturer of switches may offer different application-aware analyzers that may be coupled to their switches. Or, third-parties may offer their own application-aware analyzers. In an embodiment, a single analyzer may include application-specific logic for multiple applications (e.g. different neural networks or different rule sets that are evaluated different applications).

5.0. Example Embodiments

Examples of some embodiments are represented, without limitation, in the following clauses:

According to an embodiment, a network switching device comprises a data collector configured to collect first state information associated with components of the network switching device, the data collector further configured to send second state information to an analyzer interface, the second state information including state information in or derived from the collected first state information.

According to an embodiment, a system comprises the network switching device and an analyzer device coupled to the analyzer interface and configured to receive the second state information, the analyzer device comprising analysis logic configured to, based on the second state information received from the collector, generate a report.

According to an embodiment, a system comprises: a network switching device, the network switching device including a data collector configured to collect first state information associated with components of the network switching device, including at least a traffic manager and a packet processor, the data collector further configured to send second state information to an analyzer interface, the second state information including state information in or derived from the collected first state information; an analyzer device coupled to the analyzer interface and configured to receive the second state information, the analyzer device comprising analysis logic configured to, based on the second state information received from the collector, generate a report that identifies one or more of: a status of the network switching device, an error in operations of the network switching device, a misconfiguration of the network switching device, or a suggested action to perform with respect to the network switching device.

In an embodiment, the network switching device comprises ports configured to receive and send data units over a network, the traffic manager and the packet processor configured to implement forwarding logic that determines how to forward the data units out the ports.

In an embodiment, the data units are packets.

In an embodiment, the components of the network switching device from which the data collector is configured to collect the first state information include ports, an ingress arbiter, an ingress packet processor, a traffic manager, an egress packet processor, and an egress arbiter.

In an embodiment, each component of the components of the network switching device from which the data collector is configured to collect the first state information comprises accounting logic configured to collect component-specific state information for the component and send the component-specific state information to the collector.

In an embodiment, the components of the network switching device from which the data collector is configured to collect the first state information include multiple pipelines of components, including multiple traffic managers and multiple packet processors.

In an embodiment, the analyzer device is separate from the network switching device.

In an embodiment, the analyzer device and network switching device are coupled by a physical hardware connection or bus.

In an embodiment, the analyzer device is modular, the network switching device configured to accept connections to different analyzer devices via the analyzer interface.

In an embodiment, the analyzer device is a Field Programmable Gate Array or Application-Specific Integrated Circuit.

In an embodiment, the analyzer device is hard-wired to the network switching device.

In an embodiment, the analyzer device is a component of the network switching device.

In an embodiment, the data collector is further configured to collect data unit information of one or more data units and send the data unit information to the analyzer device via the analyzer interface, the analysis logic of the analyzer device further configured to generate the report based on the data unit information.

In an embodiment, the one or more data units is a data unit that has been dropped, wherein the report identifies one or more of: an error in the operations of the network switching device that is likely to have caused the data unit to be dropped, a misconfiguration of the network switching device that is likely to have caused the data unit to be dropped, or one or more changes to the forwarding logic of the network switching device to reduce a likelihood of dropping future data units.

In an embodiment, the one or more changes include one or more changes to a traffic shaping or flow control policy.

In an embodiment, the one or more changes include one or more changes to a forwarding table.

In an embodiment, the network switching device comprises a report processing component, wherein the report includes the suggested action, wherein the suggested action is one of: editing the one or more data units, or dropping the one or more data units, wherein the report processing component is configured to receive the report and execute the suggested action.

In an embodiment, the network switching device comprises a report processing component, wherein the report includes the suggested action, wherein the suggested action is to apply a traffic shaping policy to a traffic flow to which the one or more data units belong, wherein the report processing component is configured to receive the report and execute the suggested action.

In an embodiment, report identifies the error in the operations of the network switching device, wherein the error is a predicted error in future operations of the network switching device.

In an embodiment, the report identifies the misconfiguration of the network switching device.

In an embodiment, the network switching device comprises a report processing component, wherein the report includes the suggested action, wherein the suggested action is to apply a traffic shaping policy or flow control policy, wherein the report processing component is configured to receive the report and execute the suggested action In an embodiment, the analysis logic includes one or more neural networks, the analyzer feeding or deriving input features for the one or more neural networks from the second state information.

In an embodiment, the analyzer is further configured to continue training the one or more neural networks based on the second state information.

In an embodiment, the analysis logic includes one or more rules based on values in the second state information.

In an embodiment, the first state information includes one or more of: a buffer counter for a buffer coupled to the traffic manager, a queue size of a queue implemented by the traffic manager, a count of data units processed by the traffic manager or the packet processor, or an enumerated state of the traffic manager or the packet processor.

In an embodiment, the first state information includes different buffer counters, queue sizes, and/or counts of data units for different logical entities.

In an embodiment, the collector is configured to derive at least a portion of the second state information from the first state information, the second state information including one or more of: a rate at which the traffic manager or packet processor processes data units, a moving average of the buffer counter or the queue size, a velocity of the buffer counter or the queue size, a standard deviation of the buffer counter or the queue size, or a frequency domain conversion of the buffer counter or the queue size over a period of time.

According to an embodiment, a system comprises: a network switching device, the network switching device including a data collector configured to collect data unit information for data units arriving at the network switching device, the collector configured to forward at least particular data unit information of particular data units to an analyzer interface; an analyzer device coupled to the analyzer interface and configured to: receive the particular data unit information; identify application-specific values in the particular data unit information; log the application-specific values; input one or more of the logged application-specific values, or metrics derived from the one or more of the logged application-specific values, into analysis logic of the analyzer device, along with first application-specific values found in a first data unit described in the particular data unit information; based on an output of the analysis logic, instruct the network switching device to drop or edit the first data unit or a data unit that has a same characteristic as the first data unit.

In an embodiment, the same characteristic is an associated traffic flow identifier.

In an embodiment, the analysis logic comprises a neural network.

In an embodiment, the analyzer device is separate from the network switching device.

In an embodiment, the analyzer device is configured to parse the application specific values from payload portions of the particular data units, the payload portions received in the particular data unit information.

According to an embodiment, a method comprises: receiving state information associated with components of the network switching device, including at least a traffic manager and a packet processor; identifying values for input features of a neural network based on the received state information; evaluating the neural network using the identified values for the input features; based on an output of the neural network, generating a report that identifies one or more of: a status of the network switching device, an error in operations of the network switching device, a misconfiguration of the network switching device, or a suggested action to perform with respect to the network switching device.

In an embodiment, the method is performed by an external analyzer device coupled to the network switching device by an analyzer interface.

In an embodiment, the report identifies the suggested action to perform, the method further comprising receiving the report at the network switching device and, based on the report, executing the suggested action at the network switching device.

In an embodiment, the report identifies the suggested action to perform, the suggested action being to change a forwarding table or implement a traffic shaping policy or flow control policy.

In an embodiment, the method further comprises: receiving data unit information for a first data unit; based on the data unit information, identifying an attribute of the first data unit as a value for an additional input feature of the neural network; wherein evaluating the neural network further comprises evaluating the neural network with the attribute of the first data unit as the value for the additional input feature; wherein the report identifies the suggested action to perform, the suggested action being to drop or edit a data unit being processed by the network switching device, the data unit being the first data unit or a data unit that shares the attribute of the first data unit.

In an embodiment, the state information includes one or more metrics or states determined based on one or more of: a buffer counter for a buffer coupled to the traffic manager, a queue size of a queue implemented by the traffic manager, or a count of data units processed by the traffic manager or the packet processor.

According to an embodiment, a method comprises: repeatedly receiving state information associated with components of a first network switching device, including at least a traffic manager and a packet processor, and identifying values for input features of a neural network based on the received state information; training the neural network to recognize one or more of: an error in operations of the first network switching device, a misconfiguration of the first network switching device, or a suggested action to perform with respect to the first network switching device based on evaluating the neural network with the identified values as the input features; programming an analyzer device with the trained neural network, the analyzer device configured to interface with a network switching device of a same type as the first network switching device.

According to an embodiment, a system comprises: a network switching device comprising: network communication interfaces configured to send data units to other network devices via one or more communications networks; one or more packet processors configured to process the data units prior to sending the data units; one or more traffic managers configured to control flow of the data units to the one or more packet processors; a data collector configured to send state information out an analyzer interface, the state information describing operational states of the one or more packet processors and/or the one or more traffic managers; and device control logic configured to adjust device settings of the network switching device in response to control instructions; an analyzer device coupled to the analyzer interface and configured to receive the state information, the analyzer device comprising analysis logic configured to, based on the state information received from the collector, generate first control instructions identifying first device settings of the network switching device to change, and to send the first control instructions to the network switching device via the analyzer interface.

In an embodiment, the first device settings include at least one of a voltage or frequency setting of a component of the network switching device.

In an embodiment, the first device settings include a priority or weight assigned to a specific traffic flow of the data units.

In an embodiment, the analyzer device is configured to repeatedly: analyze new state information received from the data collector over the analyzer interface and, based thereon, issue new control instructions that adjust the first device settings in a manner optimized for one or more of: reducing power consumption of the network switching device, reducing traffic loss of the network switching device, or increasing throughput of the network switching device.

In an embodiment, the analyzer device determines the first device settings to change based on one or more of: rule-based logic or machine-learning-based logic.

In an embodiment, the analyzer device includes a programming interface configured to receive updates to the rule-based logic or machine-learning-based logic.

In an embodiment, the analyzer interface is a physical interface of the network switching device, the analyzer device being a modular device adapted for connecting to different network switching devices at different times.

In an embodiment, the one or more traffic managers include a plurality of traffic managers, each including or coupled to accounting logic configured to send statistics reflecting operations of the one or more traffic managers to the data collector.

In an embodiment, the state information includes or is derived from one or more of: a count of data unit buffers utilized, a data unit queue size, a number of dropped data units, a data unit transmission rate, a data unit reception rate, or a data unit delay time.

According to an embodiment, a network switching apparatus comprises: network communication interfaces configured to send data units to other network devices via one or more communications networks; one or more packet processors configured to process the data units prior to sending the data units; one or more traffic managers configured to control flow of the data units to the one or more packet processors; a data collector configured to send state information out an analyzer interface, the state information describing operational states of the one or more packet processors and/or the one or more traffic managers; the analyzer interface, configured to receive, from a coupled analyzer device, control instructions identifying device settings to change, responsive to sending the state information to the coupled analyzer device; and device control logic configured to adjust the device settings in response to the control instructions.

In an embodiment, the device settings include at least one of: a voltage or frequency setting of a component of the network switching device, or a priority or weight assigned to a specific traffic flow of the data units; the one or more traffic managers include a plurality of traffic managers, each including or coupled to accounting logic configured to send statistics reflecting operations of the one or more traffic managers to the data collector; and the state information includes or is derived from one or more of: a count of data unit buffers utilized, a data unit queue size, a number of dropped data units, a data unit transmission rate, a data unit reception rate, or a data unit delay time.

According to an embodiment, a method comprises: receiving data units via one or more communication interfaces of a network switching device; controlling flows of the network switching devices to one or more packet processors of the network switching device via one or more traffic managers of the network switching device; processing the data units at the one or more packet processors; sending the processed data units from the network switching device to other network devices via one or more communications networks; collecting state information reflecting operational states of the one or more packet processors and/or the one or more traffic managers; sending the state information to an analyzer device coupled to an analyzer interface of the network switching device; responsive to sending the state information to the coupled analyzer device, receiving, from the coupled analyzer device, control instructions identifying device settings of the network switching device to change; and changing the device settings of the network switching device in response to the control instructions.

In an embodiment, the device settings include at least one of: a voltage or frequency setting of a component of the network switching device, or a priority or weight assigned to a specific traffic flow of the data units.

In an embodiment, the analyzer device is configured to analyze the state information with rule-based logic and generate the control instructions based on the analyzing.

In an embodiment, the analyzer device is configured to input the state information into a neural network generate the control instructions based on results of the neural network.

In an embodiment, the analyzer device is configured to repeatedly: analyze new state information received over the analyzer interface and, based thereon, issue new control instructions that adjust the device settings in a manner optimized for one or more of: reducing power consumption of the network switching device, reducing traffic loss of the network switching device, or increasing throughput of the network switching device.

In an embodiment, the analyzer device is configured to analyze the state information with rule-based logic or machine-learning-based logic, and generate the control instructions based on the analyzing, In an embodiment, the analyzer device includes a programming interface configured to receive updates to the rule-based logic or machine-learning-based logic.

In an embodiment, the analyzer interface is a physical interface of the network switching device, the analyzer device being a modular device adapted for connecting to different network switching devices at different times.

In an embodiment, the one or more traffic managers include a plurality of traffic managers, the method further comprising sending statistics reflecting operations of the one or more traffic managers from accounting logic coupled to the traffic managers to a data collector configured to generate the state information based on the statistics.

In an embodiment, the method further comprises generating the state information based one or more of: a count of data unit buffers utilized, a data unit queue size, a number of dropped data units, a data unit transmission rate, a data unit reception rate, or a data unit delay time.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
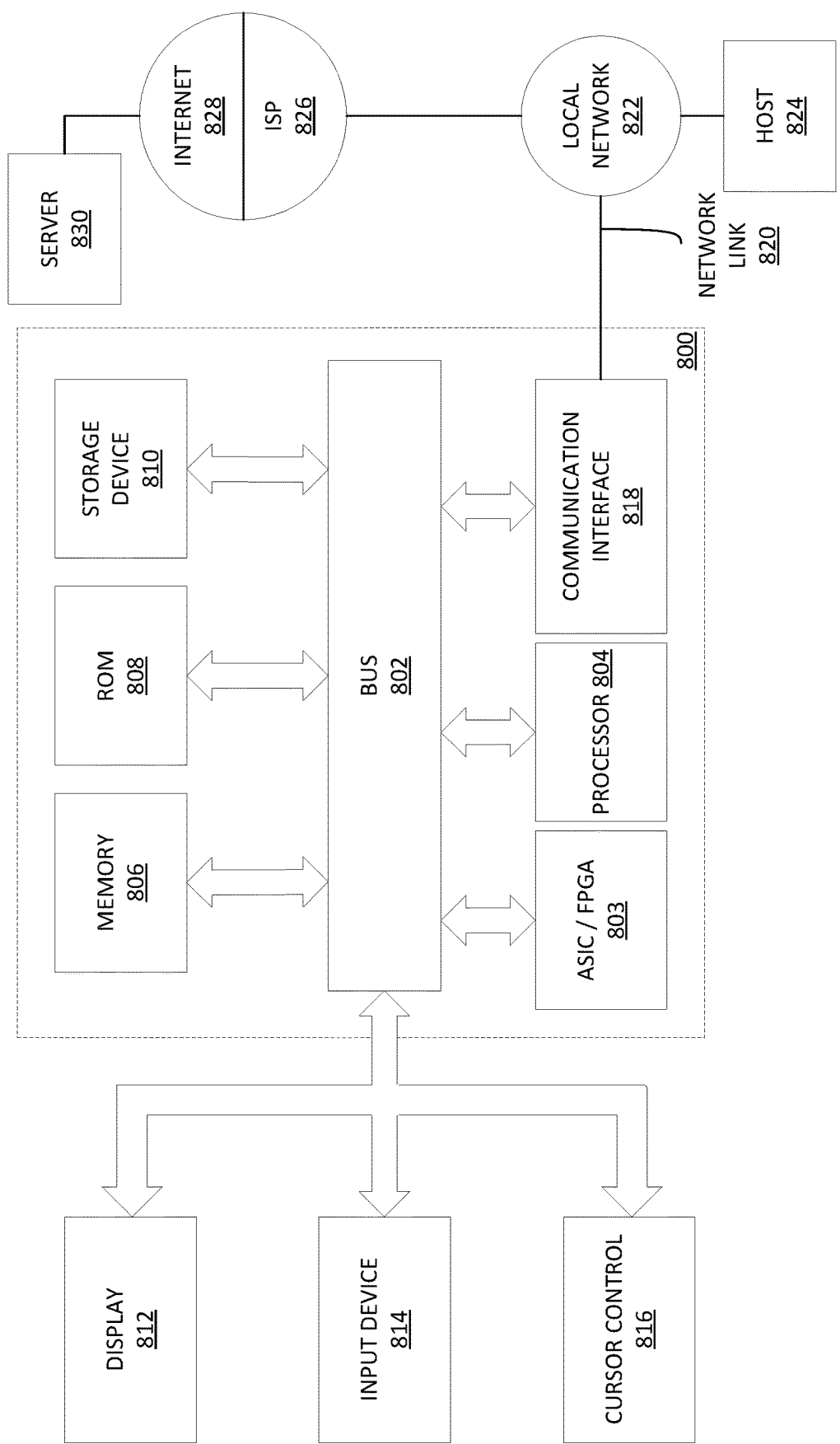
FIG. 8 is block diagram of a computer system upon which embodiments of the inventive subject matter may be implemented.

FIG. 8 is a block diagram that illustrates a computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device. In an embodiment, FIG. 8 is a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send packets and receive data through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   a network switching device comprising:
      network communication interfaces configured to send data units to other network devices via one or more communications networks;
      one or more packet processors configured to process the data units prior to sending the data units;
      one or more traffic managers configured to control flow of the data units to the one or more packet processors;
      a data collector configured to send state information out an analyzer interface, the state information describing operational states of the one or more packet processors and/or the one or more traffic managers;
      device control logic configured to adjust device settings of the network switching device in response to control instructions;
   an analyzer device coupled to the analyzer interface and configured to receive the state information, the analyzer device comprising analysis logic configured to, based on the state information received from the collector, generate first control instructions identifying first device settings of the network switching device to change, and to send the first control instructions to the network switching device via the analyzer interface.

2. The system of claim 1, wherein the first device settings include at least one of a voltage or frequency setting of a component of the network switching device.

3. The system of claim 1, wherein the first device settings include a priority or weight assigned to a specific traffic flow of the data units.

4. The system of claim 1, wherein the analyzer device is configured to repeatedly: analyze new state information received from the data collector over the analyzer interface and, based thereon, issue new control instructions that adjust the first device settings in a manner optimized for one or more of: reducing power consumption of the network switching device, reducing traffic loss of the network switching device, or increasing throughput of the network switching device.

5. The system of claim 1, wherein the analyzer device determines the first device settings to change based on one or more of: rule-based logic or machine-learning-based logic.

6. The system of claim 5, wherein the analyzer device includes a programming interface configured to receive updates to the rule-based logic or machine-learning-based logic.

7. The system of claim 1, wherein the analyzer interface is a physical interface of the network switching device, the analyzer device being a modular device adapted for connecting to different network switching devices at different times.

8. The system of claim 1, wherein the one or more traffic managers include a plurality of traffic managers, each including or coupled to accounting logic configured to send statistics reflecting operations of the one or more traffic managers to the data collector.

9. The system of claim 1, wherein the state information includes or is derived from one or more of: a count of data unit buffers utilized, a data unit queue size, a number of dropped data units, a data unit transmission rate, a data unit reception rate, or a data unit delay time.

10. A network switching apparatus comprising:
    network communication interfaces configured to send data units to other network devices via one or more communications networks;
    one or more packet processors configured to process the data units prior to sending the data units;
    one or more traffic managers configured to control flow of the data units to the one or more packet processors;
    a data collector configured to send state information out an analyzer interface, the state information describing operational states of the one or more packet processors and/or the one or more traffic managers;
    the analyzer interface, configured to receive, from a coupled analyzer device, control instructions identifying device settings to change, responsive to sending the state information to the coupled analyzer device;
    device control logic configured to adjust the device settings in response to the control instructions.

11. The apparatus of claim 10,
    wherein the device settings include at least one of: a voltage or frequency setting of a component of the network switching apparatus, or a priority or weight assigned to a specific traffic flow of the data units;
    wherein the one or more traffic managers include a plurality of traffic managers, each including or coupled to accounting logic configured to send statistics reflecting operations of the one or more traffic managers to the data collector;
    wherein the state information includes or is derived from one or more of: a count of data unit buffers utilized, a data unit queue size, a number of dropped data units, a data unit transmission rate, a data unit reception rate, or a data unit delay time.

12. A method comprising:
    receiving data units via one or more communication interfaces of a network switching device;
    controlling flows of the data units to one or more packet processors of the network switching device via one or more traffic managers of the network switching device;
    processing the data units at the one or more packet processors;

sending the processed data units from the network switching device to other network devices via one or more communications networks;

collecting state information reflecting operational states of the one or more packet processors and/or the one or more traffic managers;

sending the state information to an analyzer device coupled to an analyzer interface of the network switching device;

responsive to sending the state information to the coupled analyzer device, receiving, from the coupled analyzer device, control instructions identifying device settings of the network switching device to change;

changing the device settings of the network switching device in response to the control instructions.

13. The method of claim 12, wherein the device settings include at least one of: a voltage or frequency setting of a component of the network switching device, or a priority or weight assigned to a specific traffic flow of the data units.

14. The method of claim 12, wherein the analyzer device is configured to analyze the state information with rule-based logic and generate the control instructions based on the analyzing.

15. The method of claim 12, wherein the analyzer device is configured to input the state information into a neural network and generate the control instructions based on results of the neural network.

16. The method of claim 12, wherein the analyzer device is configured to repeatedly: analyze new state information received over the analyzer interface and, based thereon, issue new control instructions that adjust the device settings in a manner optimized for one or more of: reducing power consumption of the network switching device, reducing traffic loss of the network switching device, or increasing throughput of the network switching device.

17. The method of claim 12,
wherein the analyzer device is configured to analyze the state information with rule-based logic or machine-learning-based logic, and generate the control instructions based on the analyzing,
wherein the analyzer device includes a programming interface configured to receive updates to the rule-based logic or machine-learning-based logic.

18. The method of claim 12, wherein the analyzer interface is a physical interface of the network switching device, the analyzer device being a modular device adapted for connecting to different network switching devices at different times.

19. The method of claim 12, wherein the one or more traffic managers include a plurality of traffic managers, the method further comprising sending statistics reflecting operations of the one or more traffic managers from accounting logic coupled to the traffic managers to a data collector configured to generate the state information based on the statistics.

20. The method of claim 12, further comprising generating the state information based one or more of: a count of data unit buffers utilized, a data unit queue size, a number of dropped data units, a data unit transmission rate, a data unit reception rate, or a data unit delay time.

* * * * *